United States Patent
Izumi et al.

(10) Patent No.: US 12,363,525 B2
(45) Date of Patent: Jul. 15, 2025

(54) UNMANNED AERIAL VEHICLE (UAV)

(71) Applicant: SHARP KABUSHIKI KAISHA, Sakai (JP)

(72) Inventors: Masaki Izumi, Sakai (JP); Yudai Kawasaki, Sakai (JP); Masafumi Aramoto, Sakai (JP)

(73) Assignee: SHARP KABUSHIKI KAISHA, Sakai (JP)

(*) Notice: Subject to any disclaimer, the term of this patent is extended or adjusted under 35 U.S.C. 154(b) by 391 days.

(21) Appl. No.: 18/020,078

(22) PCT Filed: Aug. 4, 2021

(86) PCT No.: PCT/JP2021/028909
§ 371 (c)(1),
(2) Date: Feb. 6, 2023

(87) PCT Pub. No.: WO2022/030532
PCT Pub. Date: Feb. 10, 2022

(65) Prior Publication Data
US 2023/0308865 A1    Sep. 28, 2023

(30) Foreign Application Priority Data
Aug. 7, 2020 (JP) ................. 2020-134326

(51) Int. Cl.
*H04W 8/26* (2009.01)
*B64U 10/00* (2023.01)
*H04W 80/10* (2009.01)
*B64U 101/20* (2023.01)

(52) U.S. Cl.
CPC ............. *H04W 8/26* (2013.01); *B64U 10/00* (2023.01); *B64U 2101/20* (2023.01); *H04W 80/10* (2013.01)

(58) Field of Classification Search
CPC ........ H04W 8/26; H04W 80/10; B64U 10/00; B64U 2101/20
(Continued)

(56) References Cited

U.S. PATENT DOCUMENTS

2019/0116518 A1* 4/2019 Stojanovski ............ H04L 67/14
2020/0008268 A1* 1/2020 Huang-Fu ............. H04W 76/18
(Continued)

FOREIGN PATENT DOCUMENTS

WO    2020/135274 A1    7/2020

OTHER PUBLICATIONS

3GPP TR 23.754 V0.2.0 (Jun. 2020) 3rd Generation Partnership Project; Technical Specification Group Services and System Aspects; Study on supporting Unmanned Aerial Systems (UAS) connectivity, Identification and tracking (Release 17).
(Continued)

*Primary Examiner* — Mark G. Pannell
(74) *Attorney, Agent, or Firm* — ScienBiziP, P.C.

(57) ABSTRACT

A procedure in updating information of a connection in associating an Unmanned Aerial Vehicle (UAV) with a UAV controller to establish the connection is not clarified. For the connection for performing communication of the UAV, a user plane resource is to be activated. The UAV updates stored identification information and IP address of the UAV controller, based on reception, from a network, of a PDU session modification command message including identification information and IP address of the UAV controller. The UAV, in a case of establishing a PDU session that provides a QoS flow for performing Command and Control (C2) communication, transmits and/or receives information for establishing an Always-on PDU session to and/or from a network.

3 Claims, 11 Drawing Sheets

(58) Field of Classification Search
USPC .......................................................... 370/310
See application file for complete search history.

(56) References Cited

U.S. PATENT DOCUMENTS

| | | | |
|---|---|---|---|
| 2020/0092932 | A1 | 3/2020 | Youn et al. |
| 2021/0076164 | A1* | 3/2021 | Navratil ................. H04W 4/06 |
| 2021/0219364 | A1* | 7/2021 | Tang ..................... H04W 28/10 |
| 2021/0321468 | A1 | 10/2021 | Zhang et al. |
| 2022/0022089 | A1* | 1/2022 | Zhu ...................... H04W 56/001 |
| 2022/0369363 | A1* | 11/2022 | Ferdi ...................... H04W 4/44 |
| 2022/0407730 | A1* | 12/2022 | Li .......................... H04W 76/40 |
| 2023/0171320 | A1* | 6/2023 | Zhang ................... H04W 76/11 |
| | | | 709/227 |

OTHER PUBLICATIONS

3GPP TS 24.501 V16.5.1 (Jul. 2020) 3rd Generation Partnership Project; Technical Specification Group Core Network and Terminals; Non-Access-Stratum (NAS) protocol for 5G System (5GS); Stage 3; (Release 16).

3GPP TS 23.502 V16.5.0 (Jul. 2020) 3rd Generation Partnership Project; Technical Specification Group Services and System Aspects; Procedures for the 5G System (5GS); Stage 2 (Release 16).

3GPP TS 23.501 V16.5.1 (Aug. 2020) 3rd Generation Partnership Project; Technical Specification Group Services and System Aspects; System architecture for the 5G System (5GS); Stage 2 (Release 16).

Tencent, "Pseudo-CR on key issue x: UAV application server QoS provisioning", S6-201041, 3GPP TSG-SA WG6 Meeting #38-e, e-meeting, Jul. 20-31, 2020.

Samsung, "KI #6, New Sol: UAV-UAVC association control", S2-2004686, (Revision of S2-2004150), SA WG2 Meeting #139E, Jun. 1-Jun. 12, 2020.

Hauwei et al., "KI#6, New Sol: UAS authorization considering association of the UAV and UAV controller" S2-2004007, (revision of S2-2000682), 3GPP TSG-SA WG2 Meeting #139E e-meeting, Elbonia, Jun. 1-12, 2020.

Interdigital, "C2 communication switching for change of UAV-C", S2-2004169, SA WG2 Meeting #139e, Jun. 1-12, 2020, e-meeting.

* cited by examiner

UNMANNED AERIAL VEHICLE (UAV)

TECHNICAL FIELD

The present invention relates to an Unmanned Aerial Vehicle (UAV). This application claims priority based on JP 2020-134326 filed on Aug. 7, 2020, the contents of which are incorporated herein by reference.

BACKGROUND ART

In the 3rd Generation Partnership Project (3GPP), a system architecture of a 5G System (5GS) corresponding to the fifth generation (5G) mobile communication system has been under study, and support of new procedures and new functions has been discussed (see NPLs 1 to 3). A mobile communication system for a drone has been under discussion in Release 17 of the 5G standard (see NPL 4).

CITATION LIST

Non Patent Literature

NPL 1: 3GPP TS 23.501 V16.5.1 (2020-08); 3rd Generation Partnership Project; Technical Specification Group Services and System Aspects; System Architecture for the 5G System; Stage 2 (Release 16)
NPL 2: 3GPP TS 23.502 V16.5.0 (2020-07); 3rd Generation Partnership Project; Technical Specification Group Services and System Aspects; Procedures for the 5G System; Stage 2 (Release 16)
NPL 3: 3GPP TS 24.501 V16.5.1 (2020-07); 3rd Generation Partnership Project; Technical Specification Group Core Network and Terminals; Non-Access-Stratum (NAS) protocol for 5G System (5GS); Stage 3 (Release 16)
NPL 4: 3GPP TR 23.754 V0.2.0 (2020-06); 3rd Generation Partnership Project; Technical Specification Group Services and System Aspects; Study on supporting Unmanned Aerial Systems (UAS) connectivity, Identification and tracking (Release 17)

SUMMARY OF INVENTION

Technical Problem

In the discussion in NPL 4, a study is underway to associate an Unmanned Aerial Vehicle (UAV) with a UAV controller to establish a connection. A solution to the connection establishment is provided, but a procedure in updating information of the connection is not yet provided. Also, a connection for performing the communication of the UAV has a problem that the communication between the UAV and the UAV controller, and/or between the UAV and an Unmanned Aerial System Traffic Management (UTM) may not be performed unless a user plane resource is activated.

An aspect of the present invention is made in view of such circumstances as described above, and is to clarify information included in a PDU session modification command message transmitted from a network apparatus to the UAV, and behaviours of the UAV receiving the message. An aspect of the present invention is to clarify information included in a message in a PDU session establishment procedure of the UAV.

Solution to Problem

An Unmanned Aerial Vehicle (UAV) according to an aspect of the present invention includes: a transmission and/or reception unit; and a controller, the transmission and/or reception unit being configured to receive, from a network, a PDU session modification command message including first identification information and second identification information, the controller being configured to update stored identification information of a UAV controller to identification information indicated by the first identification information, based on reception of the first identification information, and update an stored IP address of the UAV controller to an IP address indicated by the second identification information, based on reception of the second identification information, wherein the first identification information is identification information of a new instance of the UAV controller, the second identification information is an IP address of a new instance of the new UAV controller, and the UAV is associated with the UAV controller.

A UAV according to an aspect of the present invention includes: a transmission and/or reception unit; and a controller, the transmission and/or reception unit being configured to, in a case of establishing a PDU session that provides a QoS flow for performing Command and Control (C2) communication, transmit, to a network, a PDU session establishment request message including first identification information, and receive, from the network, a PDU session establishment accept message including second identification information, wherein the first identification information is an Always-on PDU session requested, and the second identification information is an Always-on PDU session indication.

Advantageous Effects of Invention

According to an aspect of the present invention, it is possible to clarify information included in a PDU session modification command message transmitted from a network apparatus to the UAV, and behaviours of the UAV receiving the message. It is possible to clarify information included in a message in a PDU session establishment procedure of the UAV.

DESCRIPTION OF EMBODIMENTS

A preferred embodiment for carrying out an aspect of the present invention will be described below with reference to the drawings. Note that, as an example, an embodiment of a mobile communication system to which an aspect of the present invention is applied will be described in the present embodiment.

1. Overview of System

Figure 1:
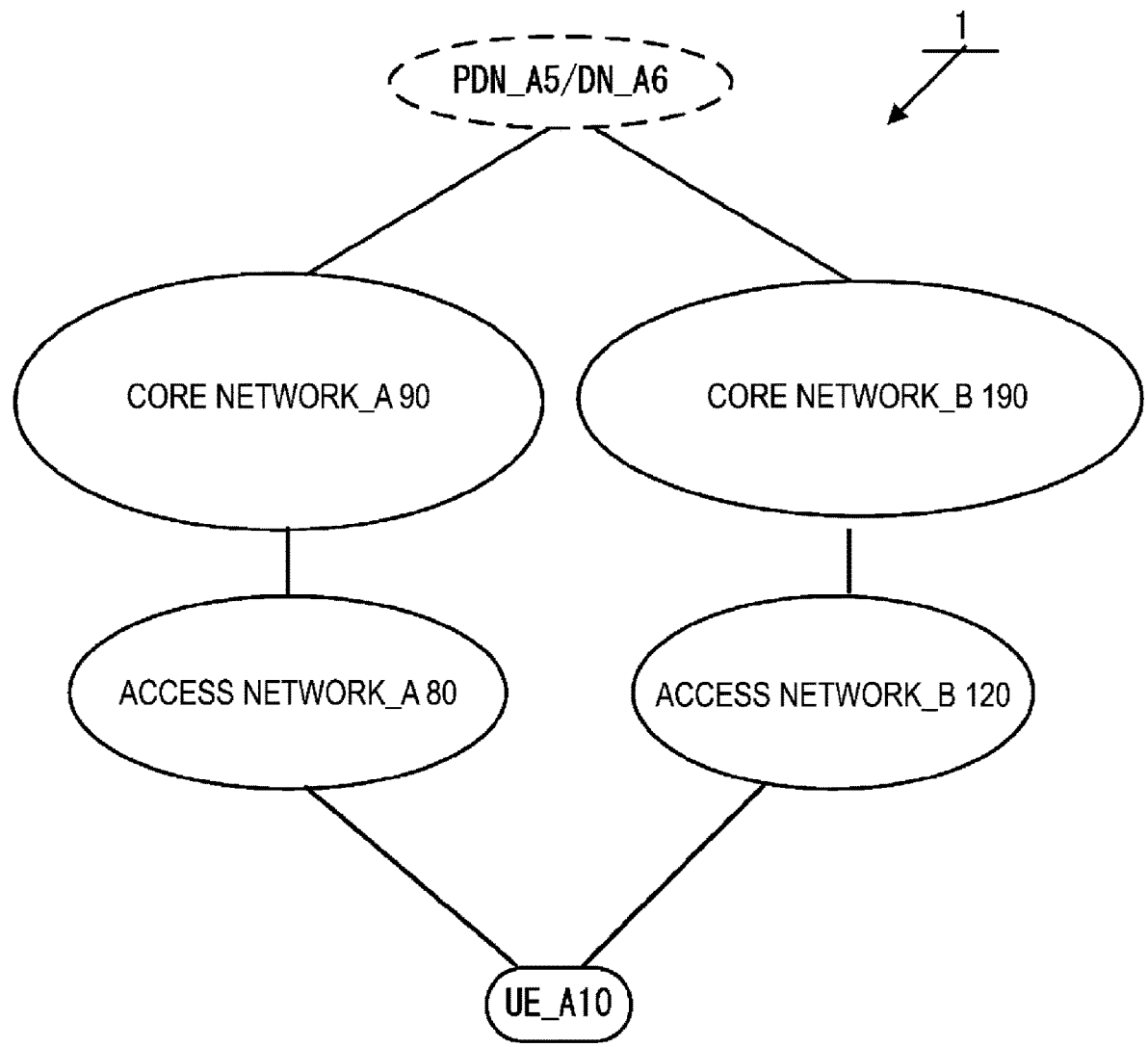
FIG. 1 is a diagram illustrating an overview of a mobile communication system (EPS/5GS).
Figure 2:
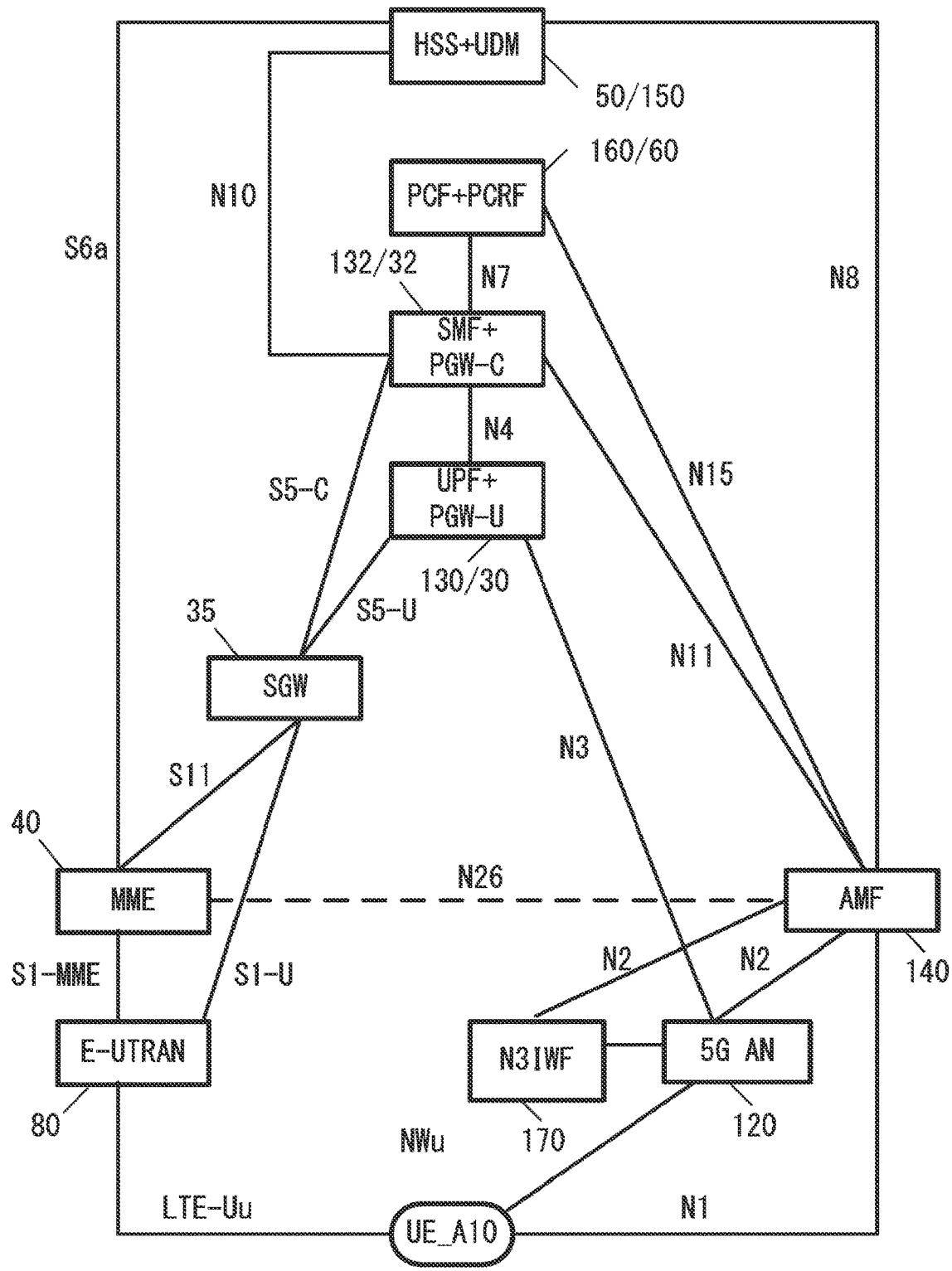
FIG. 2 is a diagram illustrating a detailed configuration of the mobile communication system (EPS/5GS).

First, FIG. 1 is a diagram illustrating an overview of a mobile communication system 1 used in each embodiment, and FIG. 2 is a diagram illustrating a detailed configuration of the mobile communication system 1.

In the illustration of FIG. 1, the mobile communication system 1 includes a UE_A 10, an access network_A 80, a core network_A 90, a Packet Data Network (PDN)_A 5, an access network_B 120, a core network_B 190, and a Data Network (DN)_A 6.

In the following description, the symbols may be omitted, such as in a UE, an access network_A, a core network_A, a PDN, an access network_B, a core network_B, and a DN, in regard to these apparatuses and functions.

Also, FIG. 2 illustrates apparatuses and functions such as a UE_A 10, an E-UTRAN 80, an MME 40, an SGW 35, a PGW-U 30, a PGW-C 32, a PCRF 60, an HSS 50, a 5G AN 120, an AMF 140, an UPF 130, an SMF 132, a PCF 160, a UDM 150, and an N3IWF 170, and interfaces for connecting these apparatuses and functions to each other.

In the following description, the symbols may be omitted, such as in a UE, an E-UTRAN, an MME, an SGW, a PGW-U, a PGW-C, a PCRF, an HSS, a 5G AN, an AMF, a UPF, an SMF, a PCF, a UDM, and an N3IWF, in regard to these apparatuses and functions.

Note that an Evolved Packet System (EPS) that is a 4G system includes the access network_A and the core network_A and may further include the UE and/or the PDN. A 5G System (5GS) that is a 5G system includes the UE, the access network_B, and the core network_B and may further include the DN.

The UE is an apparatus that can be connected to a network service over 3GPP access (also referred to as a 3GPP access network or a 3GPP AN) and/or non-3GPP access (also referred to as a non-3GPP access network or a non-3GPP AN). The UE may be a terminal apparatus capable of performing radio communication, such as a mobile phone or a smartphone, and may be a terminal apparatus that can be connected to both the EPS and the 5GS. The UE may include a Universal Integrated Circuit Card (UICC) and an Embedded UICC (eUICC). Note that the UE may be referred to as a user equipment or a terminal apparatus.

The access network_A corresponds to an Evolved Universal Terrestrial Radio Access Network (E-UTRAN) and/or a radio LAN access network. In the E-UTRAN, one or more evolved Node Bs (eNBs) 45 are deployed. Note that in the following description, the symbol for the eNB 45 may be omitted such as in an eNB. In a case that there are multiple eNBs, the eNBs are connected to each other via, for example, an X2 interface. In the radio LAN access network, one or more access points are deployed.

The access network_B corresponds to a 5G access network (5G AN). The 5G AN includes an NG Radio Access Network (NG-RAN) and/or a non-3GPP access network. In the NG-RAN, one or more NR NodeBs (gNBs) 122 are deployed. Note that in the following description, the symbol for the gNB 122 may be omitted, such as in a gNB. The gNB is a node that provides a New Radio (NR) user plane and control plane to the UE, and is connected to a 5GCN via the NG interface (including the N2 interface or the N3 interface). In other words, the gNB is a base station apparatus newly designed for the 5GS and has functions different from those of the base station apparatus (eNB) used in the EPS that is a 4G system. In a case that there are multiple gNBs, the gNBs are connected to each other via, for example, an Xn interface.

Also, a non-3GPP access network may be an untrusted non-3GPP access network or a trusted non-3GPP access network. Here, the untrusted non-3GPP access network may be a non-3GPP access network that is an access network in which security management is not performed, such as a public wireless LAN, for example. On the other hand, the trusted non-3GPP access network may be an access network defined by 3GPP and may include a trusted non-3GPP access point (TNAP) and a trusted non-3GPP Gateway function (TNGF).

In the following description, the E-UTRAN and the NG-RAN may be referred to as 3GPP access. The radio LAN access network and the non-3GPP AN may be referred to as non-3GPP access. The nodes deployed in the access network_B may also be collectively referred to as NG-RAN nodes.

In the following description, the access network_A, and/or the access network_B, and/or an apparatus included in the access network_A, and/or an apparatus included in the access network_B may be referred to as an access network or an access network apparatus.

The core network_A corresponds to an Evolved Packet Core (EPC). In the EPC, for example, a Mobility Management Entity (MME), a Serving Gateway (SGW), a Packet Data Network Gateway (PGW)-U, a PGW-C, a Policy and Charging Rules Function (PCRF), a Home Subscriber Server (HSS), and the like are deployed.

The core network_B corresponds to a 5G Core Network (5GCN). In the 5GCN, an Access and Mobility Management Function (AMF), a User Plane Function (UPF), a Session Management Function (SMF), a Policy Control Function (PCF), a Unified Data Management (UDM), and the like are deployed. Here, the 5GCN may be referred to as a 5GC.

In the following description, the core network_A, and/or the core network_B, an apparatus included in the core network_A, and/or an apparatus included in the core network_B may be referred to as a core network, a core network apparatus, or an intra-core network apparatus.

The core network (the core network_A and/or the core network_B) may refer to an IP mobile communication network operated by a mobile communication operator (Mobile Network Operator MNO)) connecting the access network (the access network_A and/or the access network_B) and the PDN and/or the DN, a core network for a mobile communication operator that operates and manages the mobile communication system 1, or a core network for a virtual mobile communication operator and a virtual mobile communication service provider such as a Mobile Virtual Network Operator (MVNO) and a Mobile Virtual Network Enabler (MVNE).

FIG. 1 illustrates a case that the PDN and the DN are the same; however the PDN and the DN may be different. The PDN may be a Data Network (DN) that provides communication services for the UE. Note that the DN may be configured as a packet data service network or may be configured for each service. In addition, the PDN may include a connected communication terminal. Thus, "to be connected to the PDN" may mean "to be connected to a communication terminal and a server apparatus deployed in the PDN". In addition, "to transmit and/or receive user data to and/or from the PDN" may mean "to transmit and/or receive user data to and/or from a communication terminal and a server apparatus deployed in the PDN". Note that the PDN may be referred to as a DN, and the DN may be referred to as a PDN.

In the following, at least some of the access network_A, the core network_A, the PDN, the access network_B, the core network_B, and the DN, and/or one or more apparatuses included in these may be referred to as a network or a network apparatus. In other words, the expression that "the network and/or the network apparatus transmits and/or receives a message and/or performs a procedure" means that "at least some of the access network_A, the core network_A, the PDN, the access network_B, the core network_B, and the DN, and/or one or more apparatuses included in these transmit and/or receive a message and/or perform a procedure".

The UE can be connected to the access network. The UE can be connected to the core network over the access network. In addition, the UE can be connected to the PDN or the DN over the access network and the core network. In other words, the UE can transmit and/or receive (communicate) user data to and/or from the PDN or the DN. In a case that user data is transmitted and/or received, not only Internet Protocol (IP) communication but also non-IP communication may be used.

Here, IP communication refers to data communication using the IP, and data is transmitted and/or received using IP packets. The IP packet includes an IP header and a payload part. In the payload part, data transmitted and/or received by the apparatuses and functions included in the EPS and the apparatuses and functions included in the 5GS may be included. Non-IP communication refers to data communication not using the IP, where data is transmitted and/or received in a form different from the structure of the IP packets. For example, non-LP communication may be data communication implemented through transmission and/or reception of application data to which an IP header is not added, or user data transmitted and/or received by the UE may be transmitted and/or received with another header such as a MAC header and an Ethernet (trade name) frame header added.

Also, apparatuses which are not illustrated in FIG. 2 may be configured in the access network_A, the core network_A, the access network_B, the core network_B, the PDN_A, and the DN_A. For example, the core network_A and/or the core network_B may include an Authentication Server Function (AUSF) and an Authentication, authorization, and accounting (AAA) server (AAA-S).

Here, an AUSF is a core network apparatus provided with an authentication function for 3GPP access and non-3GPP access. Specifically, the AUSF is a network function unit that receives an authentication request for 3GPP access and/or non-3GPP access from the UE and performs an authentication procedure.

The AAA server is an apparatus that is connected directly to the AUSF or indirectly to the AUSF via another network apparatus and has authentication, authorization, and billing functions. The AAA server may be a network apparatus within the core network. Note that the AAA server may not be included in the core network_A and/or the core network_B and may be included in the PLMN. In other words, the AAA server may be a core network apparatus or may be an apparatus outside the core network. For example, the AAA server may be a server apparatus within the PLMN managed by a third party.

Note that although each of the apparatuses and functions is illustrated one by one for simplicity in FIG. 2, multiple similar apparatuses and functions may be configured in the mobile communication system 1. Specifically, multiple apparatuses and functions such as the UE_A 10, the E-UTRAN 80, the MME 40, the SGW 35, the PGW-U 30, the PGW-C 32, the PCRF 60, the HSS 50, the 5G AN 120, the AMF 140, the UPF 130, the SMF 132, the PCF 160, and/or the UDM 150 may be configured in the mobile communication system 1.

A UPF_A 235 is connected to the DN, the SMF, another UPF, and the access network. The UPF_A 235 may play roles of an anchor to intra-RAT mobility or inter-RAT mobility, packet routing & forwarding, an uplink classifier (UL CL) function to support routing of multiple traffic flows for one DN, a branching point function to support a multi-homed PDU session, QoS processing for a user plane, verification of uplink traffic, buffering of downlink packets, a function of triggering downlink data notification, and the like. The UPF_A 235 may be a relay apparatus that transfers the user data as a gateway between the DN and the core network_B 190. Note that the UPF_A 235 may serve as a gateway for IP communication and/or non-IP communication. Furthermore, the UPF_A 235 may have a function of transferring IP communication or a function to perform conversion between non-IP communication and IP communication. The multiple gateways deployed may serve as gateways for connecting the core network_B 190 with a single DN. Note that the UPF_A 235 may have connectivity with another NF or may be connected to each apparatus via another NF.

Note that a UPF_C 239 that is a UPF different from the UPF_A 235 (also referred to as a branching point or an uplink classifier) may be present as an apparatus or an NF between the UPF_A 235 and the access network. In a case that the UPF_C 239 is present, the PDU session between the UE and the DN is established via the access network, the UPF_C 239, and the UPF_A 235.

The UPF 130 may be an apparatus similar to the UPF_A 235. Note that the UPF 130 and the UPF_A 235 may be described with symbols therefor being omitted, such as in a UPF.

2. Configuration of Each Apparatus

Next, a configuration of each apparatus (the UE, and/or the access network apparatus, and/or the core network apparatus) used in each embodiment will be described with reference to the drawings. Note that each apparatus may be configured as physical hardware, may be configured as logical (virtual) hardware configured in general-purpose hardware, or may be configured as software. At least a part (including all) of the functions of each apparatus may be configured as physical hardware, logical hardware, or software.

Note that each storage unit (a storage unit_A 340, a storage unit_A 440, a storage unit_B 540, a storage unit_A 640, and a storage unit_B 740) in each apparatus and function to be described later includes, for example, a semiconductor memory, a Solid State Drive (SSD), a Hard Disk Drive (HDD), or the like. Each storage unit can store not only information originally configured at the time of being shipped, but also various pieces of information transmitted and/or received to and/or from apparatuses and functions (for example, the UE, and/or the access network apparatus, and/or the core network apparatus, and/or the PDN, and/or the DN) other than the apparatus and functions of each storage unit. Each storage unit can store identification information, control information, flags, parameters, and the like included in a control message transmitted and/or received in various communication procedures to be described later. Each storage unit may store these pieces of information for each UE. In a case that each storage unit performs interworking between the 5GS and the EPS, each storage unit can store a control message and user data transmitted and/or received to and/or from the apparatuses and functions included in the 5GS and/or the EPS. In this case, not only information transmitted and/or received over the N26 interface but also information transmitted and/or received without using the N26 interface can be stored.

2.1. Apparatus Configuration of UE

Figure 3:
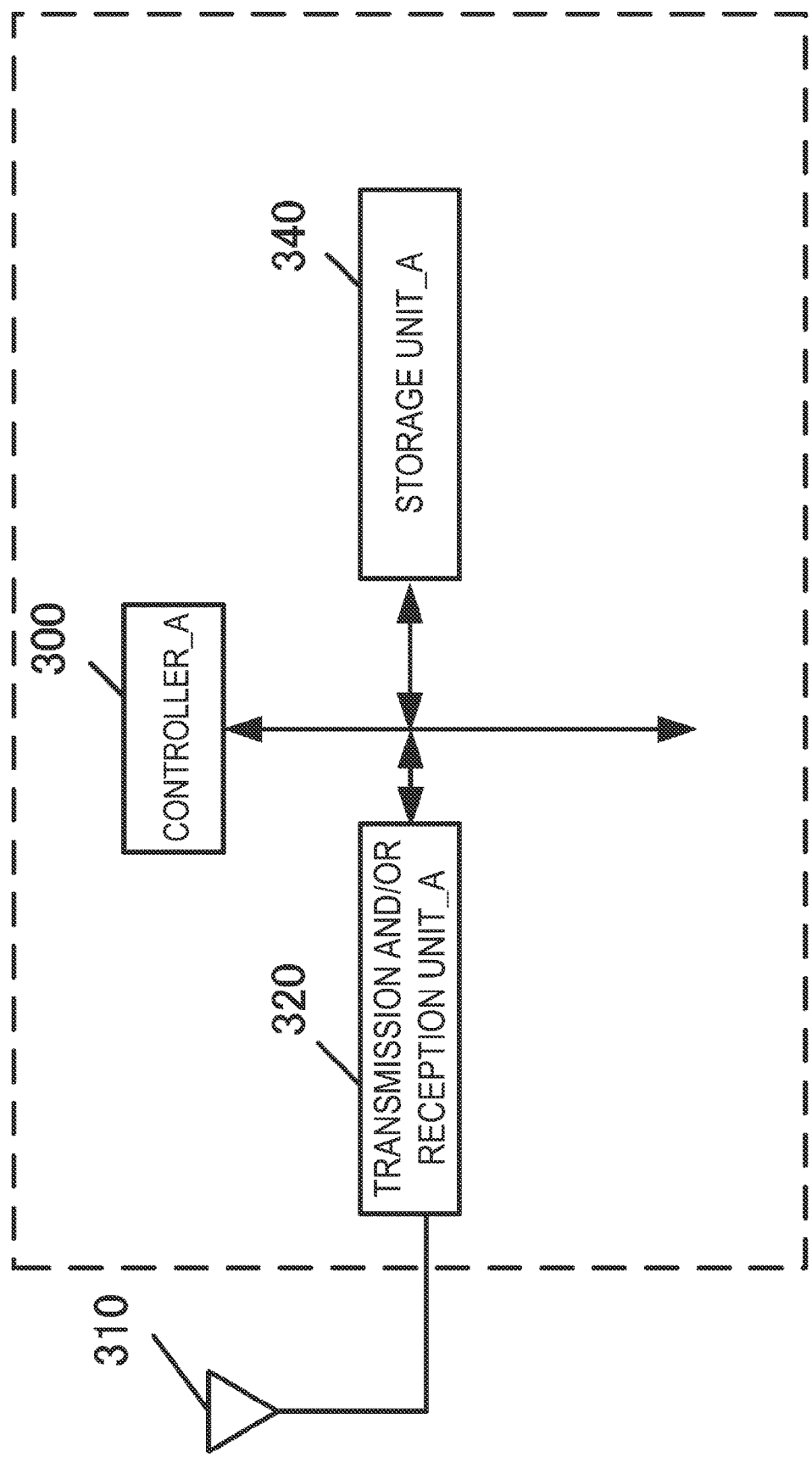
FIG. 3 is a diagram illustrating an apparatus configuration of a UE.

First, an apparatus configuration example of the User Equipment (UE) will be described with reference to FIG. 3. The UE includes a controller_A 300, an antenna 310, a transmission and/or reception unit_A 320, and a storage unit_A 340. The controller_A 300, the transmission and/or reception unit_A 320, and the storage unit_A 340 are connected via a bus. The transmission and/or reception unit_A 320 connects to the antenna 310.

The controller_A 300 is a function unit that controls the entire operations and functions of the UE. The controller_A 300 reads and performs various programs stored in the storage unit_A 340 as necessary, and thereby implements various types of processing in the UE.

The transmission and/or reception unit_A 320 is a function unit for performing radio communication with the base station apparatus (the eNB or the gNB) in the access network via the antenna. In other words, with the use of the transmission and/or reception unit_A 320, the UE can transmit and/or receive user data and/or control information to and/or from the access network apparatus, and/or the core network apparatus, and/or the PDN, and/or the DN.

Following is a detailed description with reference to FIG. 2. With the use of the transmission and/or reception unit_A 320, the UE can communicate with the base station apparatus (eNB) in the E-UTRAN over the LTE-Uu interface. The UE can communicate with the base station apparatus (gNB) in the 5G AN with the use of the transmission and/or reception unit_A 320. The UE can transmit and/or receive a Non-Access-Stratum (NAS) message to and/or from the AMF over the N1 interface with the use of the transmission and/or reception unit_A 320. Note that the N1 interface is a logical interface, and thus communication between the UE and the AMF is actually performed over the 5G AN.

The storage unit_A 340 is a function unit for storing programs, user data, control information, and the like necessary for each operation of the UE.

2.2. Apparatus Configuration of gNB

Figure 4:
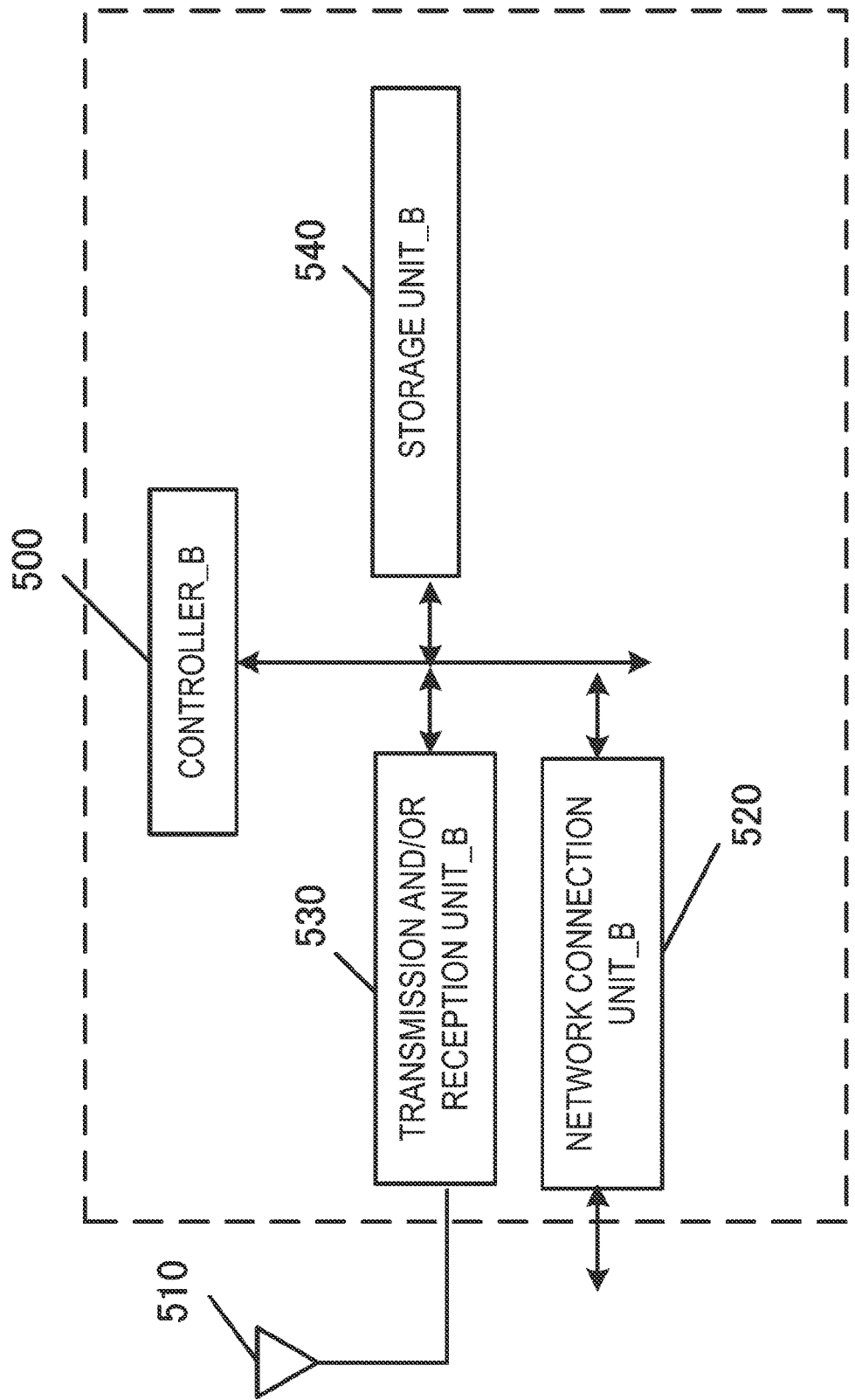
FIG. 4 is a diagram illustrating a configuration of an access network apparatus (gNB) in the 5GS.

Next, an apparatus configuration example of the gNB will be described with reference to FIG. 4. The gNB includes a controller_B 500, an antenna 510, a network connection unit_B 520, a transmission and/or reception unit_B 530, and a storage unit_B 540. The controller_B 500, the network connection unit_B 520, the transmission and/or reception unit_B 530, and the storage unit_B 540 are connected via a bus. The transmission and/or reception unit_B 530 connects to the antenna 510.

The controller_B 500 is a function unit that controls the entire operations and functions of the gNB. The controller_B 500 reads and performs various programs stored in the storage unit_B 540 as necessary, and thereby implements various types of processing in the gNB.

The network connection unit_B 520 is a function unit for the gNB to communicate with the AMF and/or the UPF. In other words, with the use of the network connection unit_B 520, the gNB can transmit and/or receive user data and/or control information to and/or from the AMF and/or the UPF.

The transmission and/or reception unit_B 530 is a function unit for performing radio communication with the UE via the antenna 510. In other words, with the use of the transmission and/or reception unit_B 530, the gNB can transmit and/or receive user data and/or control information to and/or from the UE.

Following is a detailed description with reference to FIG. 2. With the use of the network connection unit_B 520, the gNB in the 5G AN can communicate with the AMF over the N2 interface and can communicate with the UPF over the N3 interface. The gNB can communicate with the UE with the use of the transmission and/or reception unit_B 530.

The storage unit_B 540 is a function unit for storing programs, user data, control information, and the like necessary for each operation of the gNB.

2.3. Apparatus Configuration of AMF

Figure 5:
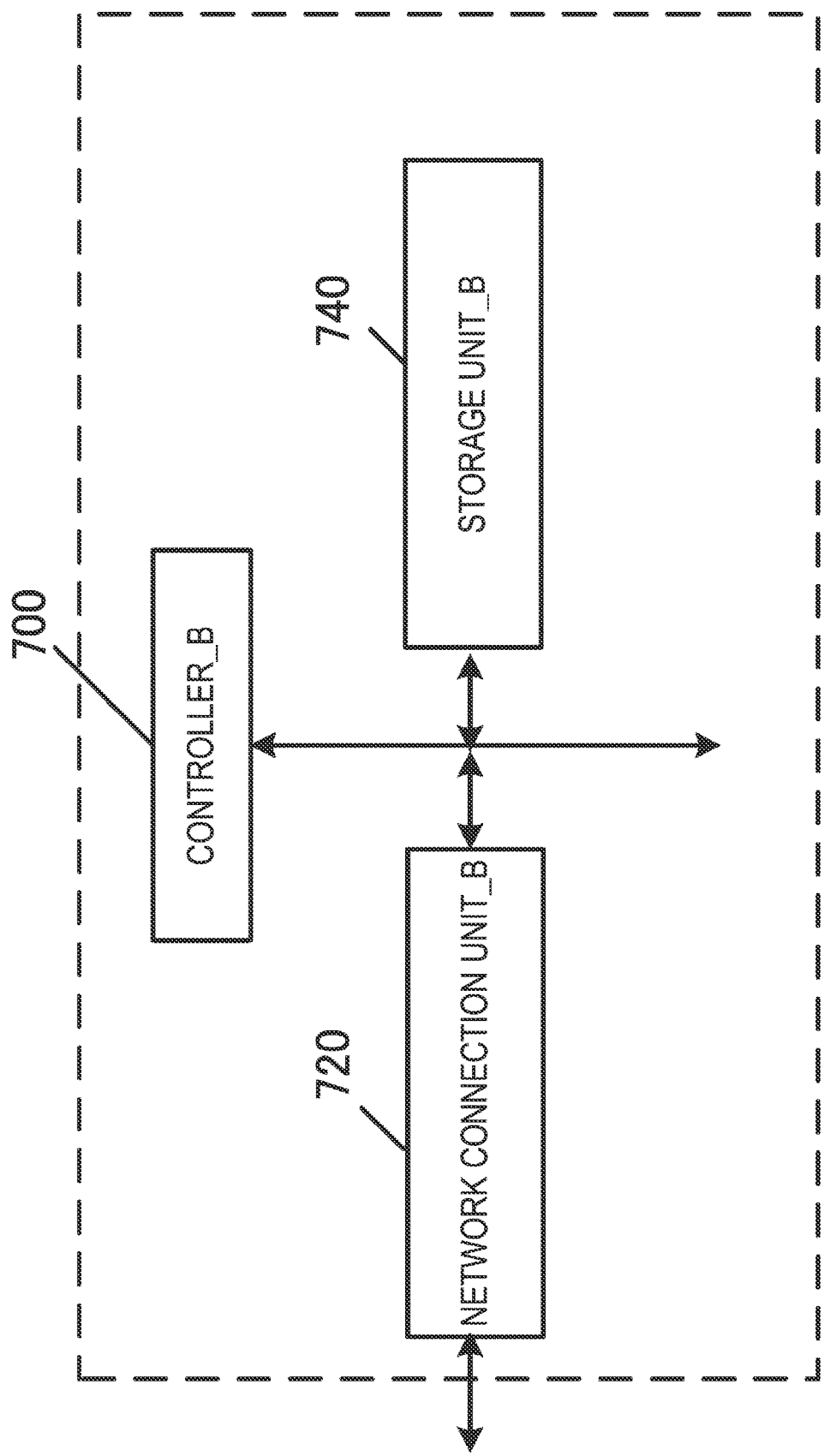
FIG. 5 is a diagram illustrating a configuration of a core network apparatus (AMF/SMF/UPF) in the 5GS.

Next, an apparatus configuration example of the AMF will be described with reference to FIG. 5. The AMF includes a controller_B 700, a network connection unit_B 720, and a storage unit_B 740. The controller_B 700, the network connection unit_B 720, and the storage unit_B 740 are connected via a bus. The AMF may be a node that handles the control plane.

The controller_B 700 is a function unit that controls the entire operations and functions of the AMF. The controller_B 700 reads and performs various programs stored in the storage unit_B 740 as necessary, and thereby implements various types of processing in the AMF.

The network connection unit_B 720 is a function unit for the AMF to connect to the base station apparatus (gNB), and/or the SMF, and/or the PCF, and/or the UDM, and/or the SCEF in the 5G AN. In other words, with the use of the network connection unit_B 720, the AMF can transmit and/or receive user data and/or control information to and/or from the base station apparatus (gNB), and/or the SMF, and/or the PCF, and/or the UDM, and/or the SCEF in the 5G AN.

Following is a detailed description with reference to FIG. 2. With the use of the network connection unit_A 620, the AMF in the 5GCN can communicate with the gNB over the N2 interface, can communicate with the UDM over the N8 interface, can communicate with the SMF over the N11 interface, and can communicate with the PCF over the N15 interface. The AMF can transmit and/or receive a NAS message to and/or from the UE over the N1 interface with the use of the network connection unit_A 620. Note that the N1 interface is a logical interface, and thus communication between the UE and the AMF is actually performed over the 5G AN. In a case that the AMF supports the N26 interface, the AMF can communicate with the MME over the N26 interface with the use of the network connection unit_A 620.

The storage unit_B 740 is a function unit for storing programs, user data, control information, and the like necessary for each operation of the AMF.

Note that the AMF has a function of exchanging a control message with the RAN using the N2 interface, a function of exchanging a NAS message with the UE using the N1 interface, a function of performing encryption and integrity protection of a NAS message, a Registration management (RM) function, a Connection management (CM) function, a Reachability management function, a Mobility management function for the UE or the like, a function of transferring a Session Management (SM) message between the UE and the SMF, an Access Authentication (Access Authorization) function, a security anchor function (Security Anchor Functionality (SEA)), a Security Context Management (SCM) function, a function of supporting the N2 interface for a Non-3GPP Interworking Function (N3IWF), a function of supporting transmission and/or reception of a NAS signal with the UE via the N3IWF, a function of authenticating the UE connected via the N3IWF, and the like.

In registration management, an RM state for each UE is managed. The RM state may be synchronized between the UE and the AMF. The RM state includes a deregistered state (RM-DEREGISTERED state) and a registered state (RM-REGISTERED state). In the RM-DEREGISTERED state, the UE is not registered in the network, and thus the AMF is in a state of being unable to reach the UE, because a UE context in the AMF does not have valid location information and routing information for the UE. In the RM-REGISTERED state, the UE is registered in the network, and thus the UE can receive a service that requires registration in the network. Note that the RM state may be referred to as a 5GMM state. In this case, the RM-DEREGISTERED state may be referred to as a 5GMM-DEREGISTERED state, and the RM-REGISTERED state may be referred to as a 5GMM-REGISTERED state.

In other words, 5GMM-REGISTERED may be a state in which each apparatus establishes a 5GMM context, or may be a state in which each apparatus establishes a PDU session context. Note that, in a case that each apparatus is 5GMM-REGISTERED, the UE_A 10 may start transmission and/or reception of user data and a control message, or may respond to paging. In addition, note that, in a case that each apparatus is 5GMM-REGISTERED, the UE_A 10 may perform a registration procedure other than a registration procedure for initial registration, and/or a service request procedure.

In addition, 5GMM-DEREGISTERED may be a state in which each apparatus does not establish the 5GMM context, may be a state in which the location information of the UE_A 10 is not known to the network, or may be a state in which the network is in a state of being unable to reach the UE_A 10. Note that, in a case that each apparatus is 5GMM-DEREGISTERED, the UE_A 10 may initiate the registration procedure, or may perform the registration procedure to thereby establish the 5GMM context.

In connection management, a CM state for each UE is managed. The CM state may be synchronized between the UE and the AMF. The CM state includes a non-connected state (CM-IDLE state) and a connected state (CM-CONNECTED state). In the CM-IDLE state, the UE is in the RM-REGISTERED state, but does not have NAS signalling connection established with the AMF via the N1 interface. In the CM-IDLE state, the UE does not have connection of the N2 interface (N2 connection) and connection of the N3 interface (N3 connection). In contrast, in the CM-CONNECTED state, the UE has NAS signalling connection established with the AMF via the N1 interface. In the CM-CONNECTED state, the UE may have connection of the N2 interface (N2 connection) and/or connection of the N3 interface (N3 connection).

In addition, in connection management, management may be performed separately for the CM state in 3GPP access and the CM state in non-3GPP access. In this case, the CM state in 3GPP access may include a non-connected state in 3GPP access (CM-IDLE state over 3GPP access) and a connected state in 3GPP access (CM-CONNECTED state over 3GPP access). In addition, the CM state in non-3GPP access may include a non-connected state in non-3GPP access (CM-IDLE state over non-3GPP access) and a connected state in non-3GPP access (CM-CONNECTED state over non-3GPP access). Note that the non-connected state may be referred to as an idle mode, and a connected state mode may be referred to as a connected mode.

Note that the CM state may be referred to as a 5GMM mode. In this case, the non-connected state may be referred to as a 5GMM non-connected mode (5GMM-IDLE mode), and the connected state may be referred to as a 5GMM connected mode (5GMM-CONNECTED mode). In addition, the non-connected state in 3GPP access may be referred to as a 5GMM non-connected mode in 3GPP access (5GMM-IDLE mode over 3GPP access), and the connected state in 3GPP access may be referred to as a 5GMM connected mode in 3GPP access (5GMM-CONNECTED mode over 3GPP access). In addition, the non-connected state in non-3GPP access may be referred to as a 5GMM non-connected mode in non-3GPP access (5GMM-IDLE mode over non-3GPP access), and the connected state in non-3GPP access may be referred to as a 5GMM connected mode in non-3GPP access (5GMM-CONNECTED mode over non-3GPP access). Note that the 5GMM non-connected mode may be referred to as an idle mode, and the 5GMM connected mode may be referred to as a connected mode.

One or more AMFs may be deployed in the core network_B. The AMF may be a Network Function (NF) that manages one or more Network Slice Instances (NSIs). The AMF may be a common CP function (Common Control Plane Network Function (CPNF) (CCNF)) shared among multiple NSIs.

Note that, in a case that the UE connects to the 5GS over non-3GPP access, the N3IWF is an apparatus deployed and/or a function allocated between non-3GPP access and the 5GCN.

2.4. Apparatus Configuration of SMF

Next, an apparatus configuration example of the SMF will be described with reference to FIG. 5. The SMF includes a controller_B 700, a network connection unit_B 720, and a storage unit_B 740. The controller_B 700, the network connection unit_B 720, and the storage unit_B 740 are connected via a bus. The SMF may be a node that handles the control plane.

The controller_B 700 is a function unit that controls the entire operations and functions of the SMF. The controller_B 700 reads and performs various programs stored in the storage unit_B 740 as necessary, and thereby implements various types of processing in the SMF.

The network connection unit_B 720 is a function unit for the SMF to connect to the AMF, and/or the UPF, and/or the PCF, and/or the UDM. In other words, with the use of the network connection unit_B 720, the SMF can transmit and/or receive user data and/or control information to and/or from the AMF, and/or the UPF, and/or the PCF, and/or the UDM.

Following is a detailed description with reference to FIG. 2. With the use of the network connection unit_A 620, the SMF in the 5GCN can communicate with the AMF over the N11 interface, can communicate with the UPF over the N4 interface, can communicate with the PCF via the N7 interface, and can communicate with the UDM over the N10 interface.

The storage unit_B 740 is a function unit for storing programs, user data, control information, and the like necessary for each operation of the SMF.

The SMF has a Session Management function such as establishment, modification, and release of a PDU session, a function of IP address allocation to the UE and management thereof, a function of selection and control of the UPF, a function of configuring the UPF for routing traffic to an appropriate destination (transmission destination), a function of transmitting and/or receiving an SM part of a NAS message, a function of issuing a notification about arrival of downlink data (Downlink Data Notification), a function of providing SM information specific to the AN (for each AN) that is transmitted to the AN through the AMF over the N2 interface, a function of determining a Session and Service Continuity mode (SSC mode) for a session, a roaming function, and the like.

2.5. Apparatus Configuration of UPF

Next, an apparatus configuration example of the UPF will be described with reference to FIG. 5. The UPF includes a controller_B 700, a network connection unit_B 720, and a storage unit_B 740. The controller_B 700, the network connection unit_B 720, and the storage unit_B 740 are connected via a bus. The UPF may be a node that handles the control plane.

The controller_B 700 is a function unit that controls the entire operations and functions of the UPF. The controller_B 700 reads and performs various programs stored in the storage unit_B 740 as necessary, and thereby implements various types of processing in the UPF.

The network connection unit_B 720 is a function unit for the UPF to connect to the base station apparatus (gNB), and/or the SMF, and/or the DN in the 5G AN. In other words, with the use of the network connection unit_B 720, the UPF can transmit and/or receive user data and/or control information to and/or from the base station apparatus (gNB), and/or the SMF, and/or the DN in the 5G AN.

Following is a detailed description with reference to FIG. 2. With the use of the network connection unit_A 620, the UPF in the 5GCN can communicate with the gNB over the N3 interface, can communicate with the SMF over the N4 interface, can communicate with the DN over the N6 interface, and can communicate with another UPF over the N9 interface.

The storage unit_B 740 is a function unit for storing programs, user data, control information, and the like necessary for each operation of the UPF.

The UPF has a function as an anchor point for intra-RAT mobility or inter-RAT mobility, a function as an external PDU session point to be mutually connected with the DN (that is, a function of transferring user data as a gateway between the DN and the core network_B), a function of routing and transferring packets, an Uplink Classifier (UL CL) function of supporting routing of multiple traffic flows for one DN, a Branching point function of supporting a multi-homed PDU session, a Quality of Service (QoS) processing function for the user plane, a function of verifying uplink traffic, a function of triggering buffering of downlink packets and Downlink Data Notification, and the like.

The UPF may be a gateway for IP communication and/or non-IP communication. The UPF may have a function of transferring IP communication, or a function of conversion between non-IP communication and IP communication. In addition, multiple deployed gateways may be gateways for connecting the core network_B and a single DN. Note that the UPF may have connectivity with another NF, and may connect to each apparatus via another NF.

Note that the user plane refers to user data that is transmitted and/or received between the UE and the network. The user plane may be transmitted and/or received using a PDN connection or a PDU session. In addition, in a case of the EPS, the user plane may be transmitted and/or received using the LTE-Uu interface, and/or the S1-U interface, and/or the S5 interface, and/or the S8 interface, and/or the SGi interface. In addition, in a case of the 5GS, the user plane may be transmitted and/or received over the interface between the UE and the NG RAN, and/or the N3 interface, and/or the N9 interface, and/or the N6 interface. The user plane may be hereinafter referred to as a U-Plane.

In addition, the control plane refers to a control message that is transmitted and/or received in order to perform communication control of the UE or the like. The control plane may be transmitted and/or received using Non-Access-Stratum (NAS) signalling connection between the UE and the MME. In addition, in a case of the EPS, the control plane may be transmitted and/or received using the LTE-Uu interface and the S1-MME interface. In addition, in a case of the 5GS, the control plane may be transmitted and/or received using the interface between the UE and the NG RAN and the N2 interface. The control plane may be hereinafter referred to as a control plane, or may be hereinafter referred to as a C-Plane.

In addition, the User Plane (U-Plane (UP)) may be a communication path for transmitting and/or receiving user data, and may include multiple bearers. In addition, the Control Plane (C-Plane (CP)) may be a communication path for transmitting and/or receiving a control message, and may include multiple bearers.

2.6. Other Apparatuses and/or Functions

Next, other apparatuses and/or functions and identification information will be described.

A network refers to at least some of the access network_B, the core network_B, and the DN. One or more apparatuses included in at least a part of the access network_B, the core network_B, and the DN may be referred to as a network or a network apparatus. In other words, "a network transmits and/or receives a message and/or performs processing" may mean "an apparatus (a network apparatus and/or a control apparatus) in the network transmits and/or receives the message and/or performs the processing". Conversely, "an apparatus in a network transmits and/or receives a message and/or performs processing" may mean "the network transmits and/or receives the message and/or performs the processing".

A Network Slice Selection Function (NSSF) may be a network function (also referred to as an NF) having a function of selecting a network slice serving the UE.

A Network Data Analytics Function (NWDAF) may be an NF having a function of performing data collection from an NF and an application function (also referred to as an AF).

A Policy Control Function (PCF) may be an NF having a function of determining a policy for controlling a behaviour of a network.

A Network Repository Function (NRF) may be an NF having a service discovery function. The NRF may be an NF that, in a case of receiving a discovery request of another NF from a certain NF, provides information of the discovered NF.

A session management (SM) message (also referred to as a Non-Access-Stratum (NAS) SM message) may be an NAS message used in a procedure for SM or may be a control message transmitted and/or received between the UE_A 10 and the SMF via the AMF. Furthermore, the SM message may include a PDU session establishment request message, a PDU session establishment accept message, a PDU session reject message (PDU session establishment reject message), a PDU session modification request message, a PDU session modification command message, a PDU session modification complete message (PDU session modification complete), a PDU session modification command reject message, a PDU session modification reject message, a PDU session release request message, a PDU session release reject message, a PDU session release command message, a PDU session release complete message, and the like.

The procedure for SM or the SM procedure may include a PDU session establishment procedure, a PDU session modification procedure, and a PDU session release procedure (UE-requested PDU session release procedure). Note that each procedure may be a procedure initiated by the UE, or may be a procedure initiated by the NW.

A Mobility management (MM) message (also referred to as a NAS MM message) may be a NAS message used for a procedure for MM, and may be a control message transmitted and/or received between the UE_A 10 and the AMF. Furthermore, the MM message may include a Registration request message, a Registration Accept message, a Registration reject message, a De-registration request message, a De-registration accept message, a configuration update command message, a configuration update complete message, a Service request message, a Service accept message, a Service reject message, a Notification message, a Notification response message, and the like.

The procedure for MM or the MM procedure may include a Registration procedure, a De-registration procedure, a Generic UE configuration update procedure, an authentication and authorization procedure, a Service request procedure, a Paging procedure, and a Notification procedure.

A 5G System (5GS) service may be a connection service provided using the core network_B 190. In addition, the 5GS service may be a service different from an EPS service, or may be a service similar to the EPS service.

A non 5GS service may be a service other than the 5GS service and may include an EPS service and/or a non EPS service.

A Packet Data Network (PDN) type indicates a type of PDN connection and includes IPv4, IPv6, 1Pv4v6, and non-IP. In a case that IPv4 is specified, it is indicated that transmission and/or reception of data is performed using IPv4. In a case that IPv6 is specified, it is indicated that transmission and/or reception of data is performed using IPv6. In a case that IPv4v6 is specified, it is indicated that transmission and/or reception of data is performed using IPv4 or IPv6. In a case that non-IP is specified, it is indicated that communication is performed using a communication method other than the IP, not communication using the IP.

Although a Protocol Data Unit/Packet Data Unit (PDU) session can be defined as a relationship between the DN that provides a PDU connectivity service and the UE, the PDU session may be connectivity established between the UE and an external gateway. In the 5GS, the UE establishes a PDU session via the access network_B and the core network_B, and can thereby perform transmission and/or reception of user data to and/or from the DN by using the PDU session. Here, the external gateway may be a UPF, an SCEF, or the like. The UE can perform transmission and/or reception of user data to and/or from an apparatus deployed in the DN, such as an application server, by using a PDU session.

Note that each apparatus (the UE, and/or the access network apparatus, and/or the core network apparatus) may associate one or more pieces of identification information with PDU session(s) for management. Note that these pieces of identification information may include one or more of a DNN, a QoS rule, a PDU session type, application identification information, NSI identification information, and access network identification information may further include other pieces of information. In addition, in a case that multiple PDU sessions are established, pieces of identification information associated with the PDU sessions may have the same or different contents.

The Data Network Name (DNN) may be identification information for identifying the core network and/or an external network such as the DN. In addition, the DNN can also be used as information for selecting a gateway such as the PGW/UPF connecting the core network B 190. In addition, the DNN may correspond to an Access Point Name (APN).

A Protocol Data Unit/Packet Data Unit (PDU) session type indicates a type of PDU session and includes IPv4, IPv6, Ethernet, and Unstructured. In a case that IPv4 is specified, it is indicated that transmission and/or reception of data is performed using IPv4. In a case that IPv6 is specified, it is indicated that transmission and/or reception of data is performed using IPv6. In a case that Ethernet is specified, it is indicated that transmission and/or reception of an Ethernet frame is performed. Alternatively, Ethernet may indicate that communication using the IP is not performed. In a case that Unstructured is specified, it is indicated that data is transmitted and/or received to and/or from an application server in the DN or the like by using a Point-to-Point (P2P) tunnelling technique. For the P2P tunnelling technique, for example, a UDP/IP encapsulation technique may be used. Note that the PDU session type may include the IP, in addition to the above. The IP can be specified in a case that the UE can use both of IPv4 and IPv6.

The Public land mobile network (PLMN) is a communication network that provides mobile radio communication services. The PLMN is a network managed by an operator who is a network operator, and the operator can be identified by a PLMN ID. A PLMN that matches a Mobile Network Code (MNC) and a Mobile Country Code (MCC) of an International Mobile Subscriber Identity (IMSI) of the UE may be a Home PLMN (HPLMN). Furthermore, the UE may hold, in the USIM, an Equivalent HPLMN list for identifying one or multiple Equivalent HPLMNs (EPLMNs). A PLMN different from the HPLMN and/or the EPLMN may be a VPLMN (Visited PLMN). A PLMN with which the UE has successfully registered may be a Registered PLMN (RPLMN).

A tracking area is a single or multiple ranges that can be expressed using the location information of the UE_A 10 managed by the core network. The tracking area may include multiple cells. In addition, the tracking area may be an area in which a control message such as paging is broadcast, or may be an area in which the UE_A 10 can move without performing a handover procedure. In addition, the tracking area may be a routing area, or may be a location area. The tracking area may be any area as long as the area is similar to these. The tracking area may be hereinafter a Tracking Area (TA). The tracking area may be identified by a Tracking Area Identity (TAI) including a Tracking area code (TAC) and the PLMN.

The Registration area is a set of one or multiple TAs allocated to the UE by the AMF. Note that while moving within one or multiple TAs included in the registration area, the UE_A 10 may be able to move without transmitting and/or receiving a signal for updating the tracking area. In other words, the registration area may be an information group indicating an area in which the UE_A 10 can move without performing the tracking area update procedure. The registration area may be identified with a TAI list including one or multiple TAIs.

A UE ID is information for identifying the UE. Specifically, the UE ID may be a Subscription Concealed Identifier (SUCI), or a Subscription Permanent Identifier (SUPI), or a Globally Unique Temporary Identifier (GUTI), or an International Mobile Subscriber Identity (IMEI), or an IMEI Software Version (IEISV), or a Temporary Mobile Subscriber Identity (TMSI), for example. Alternatively, the UE ID may be other information configured by an application or within the network. Moreover, the UE ID may be information for identifying the user.

The Unmanned Aerial Vehicle (UAV) refers to a flying drone. The UAV may be associated with a UAV controller. Further, the UAV may be associated with the UAV controller to be managed by the core network apparatus and/or the UTM. Furthermore, in a case that the UAV is associated with the UAV controller to be managed, the UAV may be managed, as a UAS, by the core network apparatus and/or the UTM. The UAV may have information (identification information, IP address, location information, etc.) managed by the core network apparatus and/or the UTM. The UAV may be a UE.

The UAV controller (Unmanned Aerial Vehicle controller) is a controller for operating the UAV. The UAV controller may be associated with the UAV. Further, the UAV controller may be associated with the UAV to be managed by the core network apparatus and/or the UTM. Furthermore, the UAV controller in the case of being associated with the UAV to be managed may be managed, as a UAS, by the core network apparatus and/or the UTM. The UAV controller may have information (identification information, IP address, location information, etc.) managed by the core network apparatus and/or the UTM. The UAV controller may be a UE. Note that the UAV controller may be represented as the UAC, or may be represented as UAV-C.

The Unmanned Aerial System (UAS) may be configured to include the UAV and the UAV controller. The UAS may be managed by the core network apparatus and/or the UTM. The UAS may be configured to include one UAV and one UAV controller.

Further, the Unmanned Aerial System (UAS) may be configured to include the UAV and associated functions. Here, the associated functions may include a C2 (command and control) link. Furthermore, the C2 (command and control) link may be a link between the UAV and the control apparatus, or may be a link between the UAV and the network. In addition, the C2 link may be a link for remote identification.

The Unmanned Aerial System Traffic Management (UTM) is an apparatus having a function for managing the UAV and/or the UAV controller and/or the UAS. The UTM may be an apparatus in the core network or may be an apparatus in the DN. The UTM may also be an apparatus for autonomously maneuvering the UAV. The UTM may have a function for managing the identification information, IP address, location information, and the like of the UAV and/or the UAV controller, or may have a function for managing other information than the above of the UAV and/or the UAV controller. Furthermore, the UTM may associate the UAV with the UAV controller to control them as the UAS. The UTM may transmit information for requesting a network service to the core network apparatus.

Further, the UTM may be an apparatus that provides one or multiple functions or services for managing a range of automatic vehicle operation. The UTM may be an apparatus that includes a function of the USS. Note that the UTM may be represented as UTM/USS, and/or USS/UTM.

The Unmanned Aerial System Service Supplier (USS) may be an apparatus in the UTM. The USS may be an apparatus included in the UTM. A function executable by the UTM may be a function executable by the USS. A behaviour executable by the UTM may be interpreted as a behaviour executable by the USS. An expression of "the UTM performs processing" may be interpreted as "the USS performs processing."

An Always-on PDU session is a PDU session where the UE must activate the user plane resources whenever the UE transitions from a 5GMM-IDLE state to a 5GMM-CONNECTED state. The UE can request the core network and/or the core network apparatus to establish a PDU session as an Always-on PDU session based on an indication from the upper layer. The core network and/or the core network apparatus determine whether the PDU session can be established as an Always-on PDU session. Here, the establishment of an Always-on PDU session may mean establishment of a PDU session for C2 communication. Furthermore, the establishment of an Always-on PDU session may mean establishment of a PDU session that handles a QoS flow for C2 communication.

Here, the 5GMM-IDLE state may be the CM-IDLE state. Further, the 5GMM-CONNECTED state may be the CM-CONNECTED state. Furthermore, the core network apparatus that determines whether the PDU session can be established as an Always-on PDU session may be the SMF.

The Command and Control (C2) communication is a user plane communication path for delivering a message including a command and control information for operating the UAV from the UAV controller or UTM to the UAV. Further, the 2 communication may be a user plane communication path for reporting telemetry data from the UAV to the UAV controller or the UTM. The C2 communication may be a user plane communication path for delivering a message including a command and control information for operating the UAV from the UAV controller via the UTM to the UAV.

Here, the C2 communication may be a communication path realized by the PDU session. Furthermore, the PDU session for C2 communication may be realized by the Always-on PDU session. Furthermore, establishment of the PDU session for C2 communication may mean establishment of the Always-on PDU session. Furthermore, establishment of the PDU session handling a QoS flow for C2 communication may mean establishment of the Always-on PDU session.

2.7. Identification Information in the Present Embodiment

Now, description will be given of the identification information transmitted and/or received and stored and managed by apparatuses in the present embodiment.

First, first identification information is information for requesting to establish a PDU session as an Always-on PDU session. The first identification information may be information indicating whether or not to request to establish a PDU session as an Always-on PDU session. Furthermore, the first identification information may be an Always-on PDU session requested information element.

Furthermore, the first identification information may be information indicating whether or not to request to establish an Always-on PDU session. For example, the first identification information may be information indicating requesting to establish an Always-on PDU session. Conversely, the first identification information may be information indicating not requesting to establish an Always-on PDU session.

Here, the establishment of an Always-on PDU session may mean establishment of a PDU session for C2 communication. Furthermore, the establishment of an Always-on PDU session may mean establishment of a PDU session that handles a QoS flow for C2 communication.

Second identification information is information indicating establishing a PDU session as an Always-on PDU session. The second identification information may be information indicating whether or not to establish a PDU session as an Always-on PDU session. Furthermore, the second identification information may be information indicating whether or not establishment of an Always-on PDU session is allowed. The second identification information may be an Always-on PDU session indication information element.

Furthermore, the second identification information may be information indicating whether or not an Always-on PDU session is established. In other words, the second identification information may be information indicating whether or not establishment of an Always-on PDU session is made. For example, the second identification information may be information indicating that establishment of an Always-on PDU session is required. Conversely, the second identification information may be information indicating that establishment of an Always-on PDU session is not allowed.

Here, the establishment of an Always-on PDU session may mean establishment of a PDU session for C2 communication. Furthermore, the establishment of an Always-on PDU session may mean establishment of a PDU session that handles a QoS flow for C2 communication.

Tenth identification information is identification information of the UAV controller. The tenth identification information may be identification information of a new UAV controller. Furthermore, the tenth identification information may be identification information different from the identification information of the UAV controller stored in the UAV. Conversely, the tenth identification information may be the same identification information as the identification information of the UAV controller stored in the UAV.

The tenth identification information may be information associated with eleventh identification information. Specifically, the UAV controller identified by the tenth identification information may be a UAV controller allocated with an IP address indicated by the eleventh identification information.

Here, the UAV controller may be a UAV controller associated with the UAV. To be more specific, the UAV controller may be a UAV controller associated with a UAV receiving the tenth identification information and/or the eleventh identification information.

The eleventh identification information is an IP address of the UAV controller. The eleventh identification information may be an IP address of a new UAV controller. Further, the eleventh identification information may be identification information different from the IP address of the UAV controller stored in the UAV. Conversely, the eleventh identification information may be identification information the same as the IP address of the UAV controller stored in the UAV.

Furthermore, the eleventh identification information may be information associated with the tenth identification information. Specifically, the IP address indicated by the eleventh identification information may be an IP address of the UAV controller identified by the tenth identification information.

Here, the UAV controller may be a UAV controller associated with the UAV. To be more specific, the UAV controller may be a UAV controller associated with a UAV receiving the tenth identification information and/or the eleventh identification information.

Twelfth identification information is identification information of the UAV. The twelfth identification information may be identification information of a new UAV. Further, the twelfth identification information may be identification information different from the identification information of the UAV stored in the UAV controller. Conversely, the twelfth identification information may be the same identification information as the identification information of the UAV stored in the UAV controller.

Furthermore, the twelfth identification information may be information associated with thirteenth identification information. Specifically, the UAV identified by the twelfth identification information may be a UAV allocated with an IP address indicated by the thirteenth identification information.

Here, the UAV may be a UAV associated with the UAV controller. To be more specific, the UAV may be a UAV associated with a UAV controller receiving the twelfth identification information and/or the thirteenth identification information.

The thirteenth identification information is an IP address of the UAV. The thirteenth identification information may be an IP address of a new UAV. Further, the thirteenth identification information may be identification information different from the IP address of the UAV stored in the UAV controller. Conversely, the thirteenth identification information may be identification information the same as the IP address of the UAV stored in the UAV controller.

Furthermore, the thirteenth identification information may be information associated with the twelfth identification information. Specifically, the IP address indicated by the thirteenth identification information may be an IP address of the UAV identified by the twelfth identification information.

Here, the UAV may be a UAV associated with the UAV controller. To be more specific, the UAV may be a UAV associated with a UAV controller receiving the twelfth identification information and/or the thirteenth identification information.

Fourteenth identification information is information indicating whether or not a PDU session is established as an Always-on PDU session. The fourteenth identification information may be the same identification information as the second identification information.

Further, the fourteenth identification information may be information indicating whether or not the established PDU session is handled as an Always-on PDU session. Furthermore, the fourteenth identification information may be information indicating whether or not the established PDU session is re-established as an Always-on PDU session.

In addition, contents indicated by the fourteenth identification information may be the same as or different from information indicated by the second identification information.

Specifically, in a case that the second identification information indicates that establishment of an Always-on PDU session is required, the fourteenth identification information may indicate that establishment of an Always-on PDU session is required. Further, in a case that the second identification information indicates that establishment of an Always-on PDU session is not allowed, the fourteenth identification information may indicate that establishment of an Always-on PDU session is not allowed.

Conversely, in the case that the second identification information indicates that establishment of an Always-on PDU session is required, the fourteenth identification information may indicate that establishment of an Always-on PDU session is not allowed. Further, in the case that the second identification information indicates that establishment of an Always-on PDU session is not allowed, the fourteenth identification information may indicate that establishment of an Always-on PDU session is required.

Here, the establishment of an Always-on PDU session may mean establishment of a PDU session for C2 communication. Furthermore, the establishment of an Always-on PDU session may mean establishment of a PDU session that handles a QoS flow for C2 communication.

Twentieth identification information is information indicating one or more cause values indicating a cause why the PDU session modification procedure and/or the PDU session release procedure are rejected. For example, the cause value may be information indicating that the UE is in flight, or may be information indicating a cause value indicating rejection except that the UE is in flight.

3. First Embodiment

3.1. Procedures Used in First Embodiment

First, procedures used in a first embodiment will be described. Procedures used in a first embodiment include a registration procedure, a PDU session establishment procedure, a PDU session modification procedure, a PDU session release procedure, and the like. Hereinafter, each procedure will be described.

Note that, in the first embodiment, a case that each of the combinations including the HSS and the UDM, the PCF and the PCRF, the SMF and the PGW-C, and the UPF and the PGW-U is configured to form a single apparatus/function (that is, the same physical hardware, or the same logical hardware, or the same software) as illustrated in FIG. 2 will be described as an example. However, the details described in the present embodiment can also be applied to a case that each of the combinations is configured to form different apparatuses/functions (that is, different pieces of physical hardware, or different pieces of logical hardware, or different pieces of software). For example, data may be directly transmitted and/or received between these apparatuses, data may be transmitted and/or received over the N26 interface between the AMF and the MME, or data may be transmitted and/or received via the UE.

Figure 10:
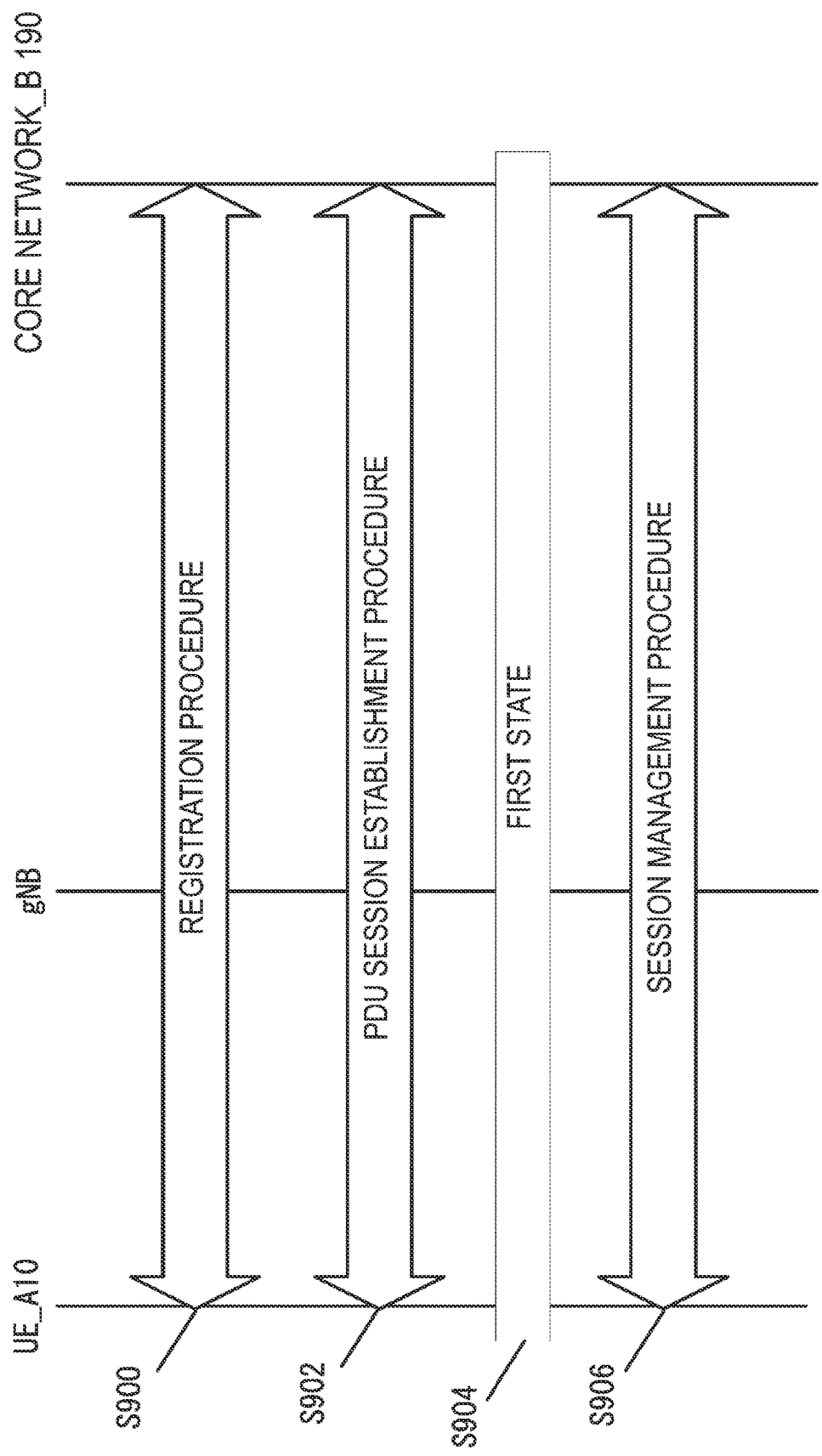
FIG. 10 is a diagram illustrating a communication procedure.

Next, a communication procedure will be described with reference to FIG. 10. Hereinafter, the communication procedure is also referred to as a present procedure, and the present procedure includes the Registration procedure, the UE-initiated PDU session establishment procedure, and the session management procedure. Details of the registration procedure, the PDU session establishment procedure, and the session management procedure will be described later.

Specifically, by performing the registration procedure by each apparatus (S900), the UE transitions to a state registered with the network (RM-REGISTERED state). Next, by performing the PDU session establishment procedure by each apparatus (S902), the UE establishes the PDU session with the DN that provides the PDU connection service via the core network_B 190, and each apparatus transitions to a first state (S904). Note that this PDU session is assumed to be established via the access network and the UPF_A 235, but is not limited thereto. That is, a UPF (UPF_C 239) different from the UPF_A 235 may be present between the UPF_A 235 and the access network. At this time, the PDU session is established via the access network, the UPF_C 239, and the UPF_A 235. Next, each apparatus in the first state may then perform the session management procedure at any timing (S906). Here, the session management procedure may be a network-initiated session management procedure, or may be a UE-initiated session management procedure.

Note that each apparatus may perform the session management procedure multiple times. For example, each apparatus may perform a second session management procedure after performing the first session management procedure. Here, the first session management procedure may be a network-initiated session management procedure, or may be a UE-initiated session management procedure. Further, the second session management procedure may be a network-initiated session management procedure, or may be a UE-initiated session management procedure. Furthermore, the first session management procedure and the second session management procedure may be the same type of procedure, or may be different types of procedure.

Note that each apparatus may exchange various pieces of capability information and/or various pieces of request information of each apparatus in the registration procedure and/or the PDU session establishment procedure and/or the network-initiated session management procedure. Note that in a case that each apparatus performs the exchange of various pieces of information and/or negotiation of various requests in the registration procedure, each apparatus may or may not perform the exchange of various pieces of information and/or the negotiation of various requests in the PDU session establishment procedure and/or the network-initiated session management procedure. In a case that each apparatus does not perform the exchange of various pieces of information and/or the negotiation of various requests in the registration procedure, each apparatus may perform the exchange of various pieces of information and/or the negotiation of various requests in the PDU session establishment procedure and/or the network-initiated session management procedure. Even in the case that each apparatus performs the exchange of various pieces of information and/or the negotiation of various requests in the registration procedure, each apparatus may perform the exchange of various pieces of information and/or the negotiation of various requests in the PDU session establishment procedure and/or the network-initiated session management procedure.

In addition, each apparatus may perform the PDU session establishment procedure in the registration procedure or after the registration procedure is completed. Furthermore, in a case that the PDU session establishment procedure is performed in the registration procedure, the PDU session establishment request message included in the registration request message may be transmitted and/or received, and the PDU session establishment accept message included in the registration accept message may be transmitted and/or received, a PDU session establishment complete message included in a registration complete message may be transmitted and/or received, and a PDU session establishment reject message included in a registration reject message may be transmitted and/or received. In a case that the PDU session establishment procedure is performed in the registration procedure, each apparatus may establish a PDU session or may transition to a state where a PDU session is established between the apparatuses, based on the completion of the registration procedure.

Furthermore, each apparatus involved in the present procedure may transmit and/or receive each control message described in the present procedure to transmit and/or receive one or more pieces of identification information included in each control message and store each piece of identification information transmitted and/or received as a context.

Figure 11:
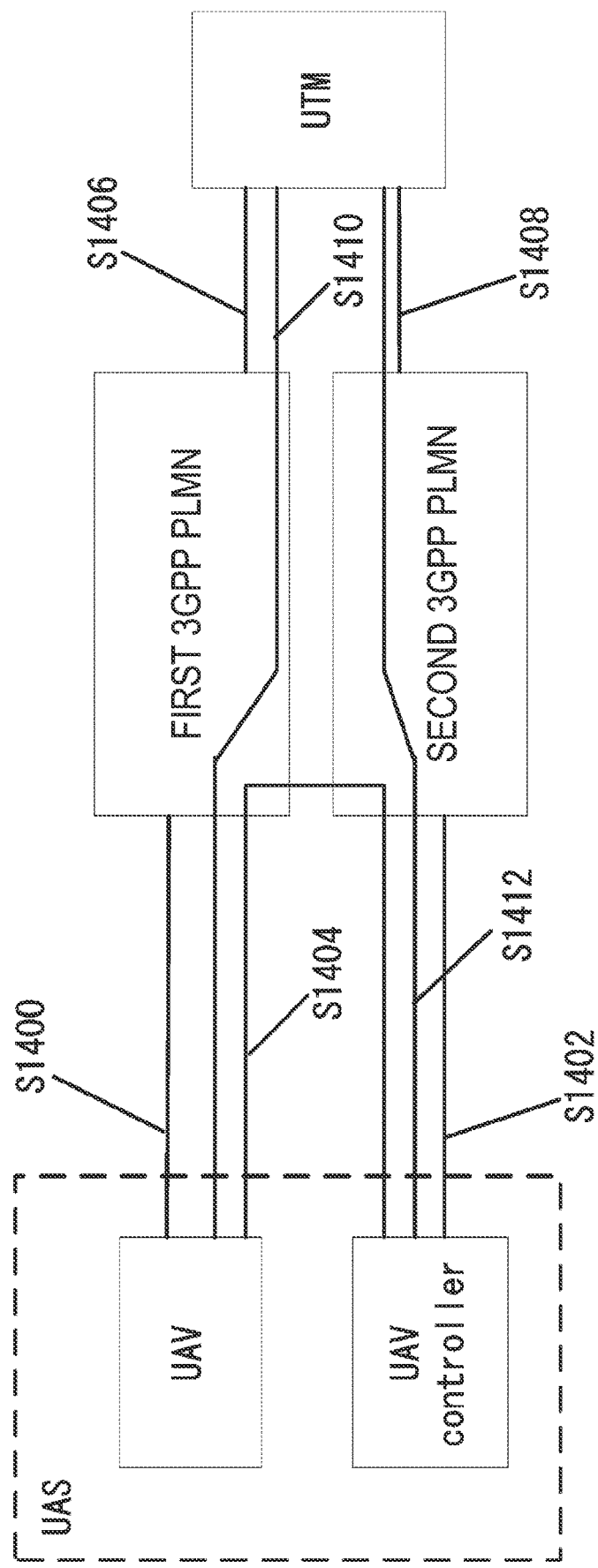
FIG. 11 is a diagram illustrating a communication configuration for the UAV.

A communication configuration for the UAV in the present procedure is illustrated in FIG. 11. Note that the UAV may be associated with the UAV controller to be managed by the core network apparatus and/or the UTM. Further, the UAV in the case of being associated with the UAV controller to be managed may be managed, as a UAS, by the core network apparatus and/or the UTM.

Firstly, the UAV is connected to a first 3GPP PLMN (S1400), and the UAV controller is connected to a second 3GPP PLMN (S1402). Further, the UTM is connected to the first 3GPP PLMN and/or the second 3GPP PLMN (S1406) (S1408).

Note that communication between the UAV and the first 3GPP PLMN may be performed using a UAV1 interface (S1400). Furthermore, communication between the UAV controller and the second 3GPP PLMN may also be performed using the UAV1 interface (S1402). In addition, communication between the UTM, and the first 3GPP PLMN and/or second 3GPP PLMN may be performed using a UAV6 interface.

Next, the UAV and the UTM may communicate with each other via the first 3GPP PLMN (S1410). Further, the UAV controller and the UTM may communicate with each other via the second 3GPP PLMN (S1412).

Note that the communication between the UAV and the UTM may be performed using a UAV9 interface (S1410). Furthermore, the communication between the UAV controller and the UTM may be performed also using the UAV9 interface (S1412).

Next, the UAV and the UAV controller may perform communication between the UAV and the UAV controller. Specifically, the UAV and the UAV controller may perform communication via the first 3GPP PLMN and the second 3GPP PLMN without via the UTM (S1404), or may perform communication via the first 3GPP PLMN, the UTM, and the second 3GPP PLMN (S1410) (S1412).

Note that the communication between the UAV and the UAV controller via the first 3GPP PLMN and the second 3GPP PLMN without via the UTM may be performed using a UAV3 interface. Further, the communication between the UAV and the UAV controller via the first 3GPP PLMN, the UTM, and the second 3GPP PLMN may be performed using the UAV9 interface.

Here, the UAV1 interface may be an interface connecting the UAV and/or the UAV controller with the 3GPP PLMN. Further, the UAV3 interface may be an interface connecting the UAV with the UAV controller. Furthermore, the UAV6 interface may be an interface connecting the UTM with the 3GPP PLMN. Furthermore, the UAV9 interface may be an interface connecting the UAV and/or the UAV controller with the UTM.

Further, the first 3GPP PLMN and the second 3GPP PLMN may be communication networks providing mobile radio communication services. The first 3GPP PLMN and the second 3GPP PLMN may be communication networks including an access network and/or a core network. Further, the first 3GPP PLMN and the second 3GPP PLMN may be referred to simply as the PLMN. Here, the first 3GPP PLMN and the second 3GPP PLMN may be the same PLMN, or may be different PLMNs.

Note that although an example in which the PLMN connected by the UAV is different from the PLMN connected by the UAV controller, the PLMN connected by the UAV and the PLMN connected by the UAV controller may be the same PLMN. In this case, the first 3GPP PLMN and the second 3GPP PLMN described above may be the same PLMN. Further, in this case, the UAV, the UAV controller, and the UTM may be connected to the same PLMN. Furthermore, in this case, the communication between the first 3GPP PLMN and the second 3GPP PLMN may be communication within the same PLMN. For example, in this case, the communication between the UAV and the UAV controller without the UTM (S1404) may be communication that is turned back within a single PLMN.

3.2. System Information Acquisition Procedure 3.3. Registration Procedure

Figure 6:
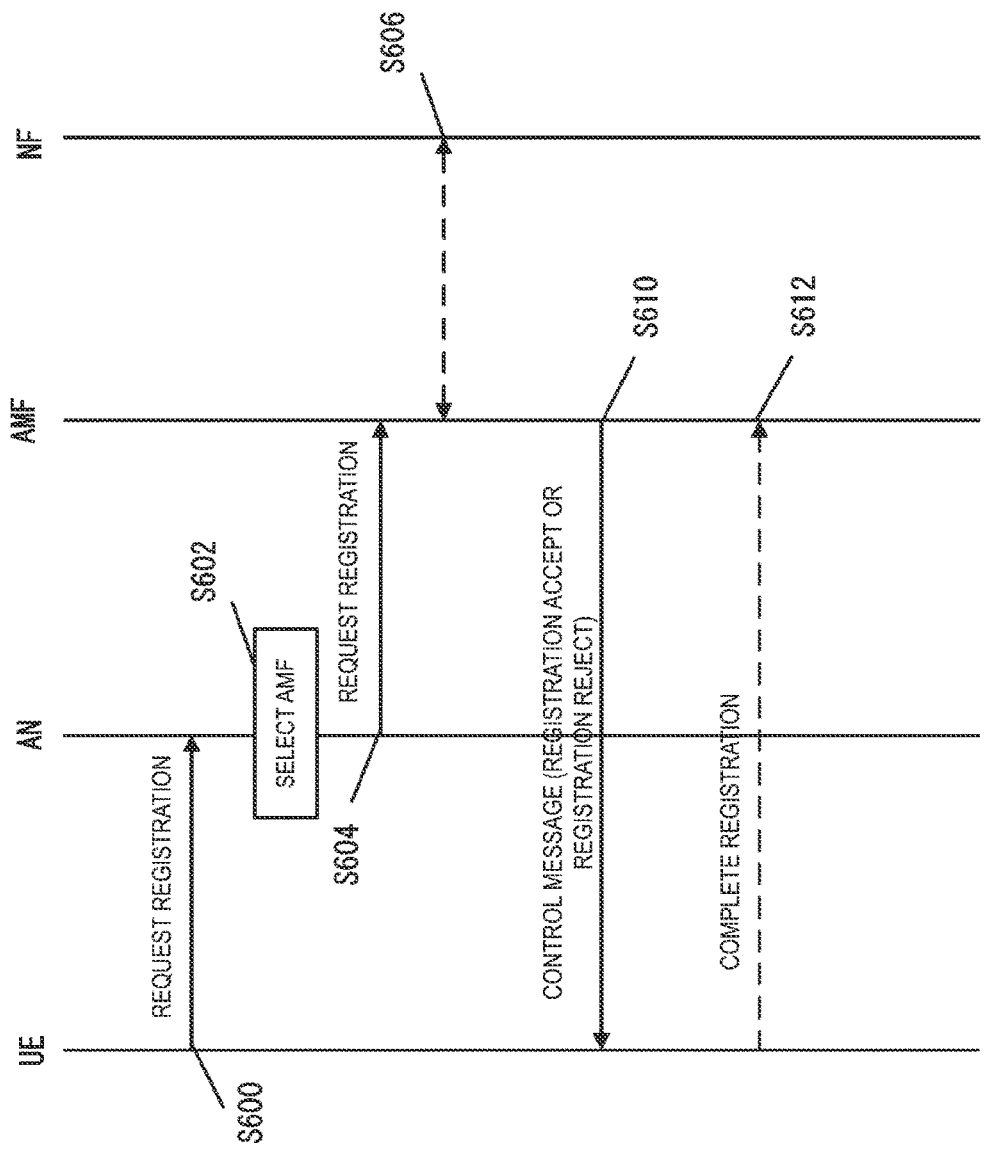
FIG. 6 is a diagram illustrating a registration procedure.

Next, the Registration procedure will be described with reference to FIG. 6. In this chapter, this registration procedure may be referred to simply as the present procedure. The registration procedure is a procedure for registration with the access network_B, and/or the core network_B, and/or the DN as initiated by the UE. In a case that the UE is in a state of not being registered with the network, for example, the UE can perform the present procedure at any timing such as the timing at which the UE is turned on. In other words, the UE can initiate the present procedure at any timing in a case that the UE is in the deregistered state (5GMM-DEREGISTERED state). Each apparatus (in particular, the UE and the AMF) can transition to the registered state (5GMM-REGISTERED state), based on completion of the registration procedure. Note that each registered state may be managed by each apparatus for each access. Specifically, each apparatus may independently manage the registration state (registered state or deregistered state) for the 3GPP access and the registration state for the non-3GPP access.

In addition, the registration procedure may be a procedure for updating position registration information of the UE in the network, and/or periodically giving a notification of the state of the UE from the UE to the network, and/or updating a specific parameter related to the UE in the network.

In a case that the UE performs mobility for crossing a TA, the UE may initiate the registration procedure. In other words, in a case that the UE moves to a TA that is different from the TA indicated in the stored TA list, the UE may initiate the registration procedure. In addition, the UE may initiate the registration procedure in a case that a context of each apparatus needs to be updated due to disconnection and deactivation of a PDU session. In addition, in a case that there is a change in capability information and/or a preference, related to PDU session establishment, of the UE, the UE may initiate the registration procedure. In addition, the UE may periodically initiate the registration procedure. Further, the UE may initiate the registration procedure, based on completion of the registration procedure or completion of the PDU session establishment procedure, or information received from the network in each procedure. Note that these are not restrictive, and the UE can perform the registration procedure at any timing.

Note that the above-described procedure for the UE to transition from the state (deregistered state) of not being registered with the network to the state (registered state) of being registered therewith may be an initial registration procedure or a registration procedure for initial registration. The registration procedure performed in the state (registered state) in which the UE is registered with the network may be a registration procedure for mobility and periodic registration update or a mobility and periodic registration procedure.

First, the UE initiates the registration procedure by transmitting the Registration request message to the new AMF (S600), (S602), and (S604). Specifically, the UE transmits an RRC message including the registration request message to the base station apparatus (also referred to as 5G AN or gNB) (S600). Moreover, the registration request message is an NAS message transmitted and/or received over the N1 interface. The RRC message may be a control message transmitted and/or received between the UE and the base station apparatus. The NAS message is processed in the NAS layer, and the RRC message is processed in the RRC layer. Note that the NAS layer is a layer upper than the RRC layer.

Here, the UE may include and transmit identification information indicating the type of the present procedure, in the registration request message and/or the RRC message. Here, the identification information indicating the type of the present procedure may be a 5GS registration type Information Element (IE), and may be information indicating that the present procedure is the registration procedure executed for an initial registration, or for update of registration information associated with movement, or for periodic update of registration information, or for emergency registration.

The UE may include UE capability information in the registration request message to notify the network of the functions supported by the UE. Here, the capability information of the UE may be 5GMM capability IE of the 5GS.

The UE may include and transmit these pieces of identification information in a control message different from these, such as a control message of a layer (for example, a Medium Access Control (MAC) layer, a Radio Link Control (RLC) layer, a Packet Data Convergence Protocol (PDCP) layer, a Service Data Adaptation Protocol (SDAP) layer) that is lower than the RRC layer. Note that, by transmitting these pieces of identification information, the UE may indicate that the UE supports each function, may indicate a request of the UE, or may indicate both of these.

The UE may include and transmit the UE ID and/or the PLMN ID and/or AMF identification information, for example, in the registration request message and/or the RRC message. Here, the AMF identification information may be information for identifying an AMF or a set of AMFs, and may be, for example, a 5G S-Temporary Mobile Subscription Identifier (5G-S-TMSI) or a Globally Unique AMF Identifier (GUAMI).

In a case that the base station apparatus receives the RRC message including the registration request message, the base station apparatus selects the AMF to transfer the registration request message (S602). The base station apparatus extracts the registration request message from the received RRC message and transfers the registration request message to the selected AMF (S604).

In a case that the AMF receives the registration request message, the AMF can perform a first condition fulfillment determination. The first condition fulfillment determination is a condition for determining whether or not the network accepts the request from the UE. In a case that the AMF determines that the first condition fulfillment determination is true, the AMF may perform procedures in S610 to S612.

In a case that the AMF determines that the first condition fulfillment determination is false, the AMF may perform a procedure in S610.

The first condition fulfillment determination may be performed by a network function (also referred to as an NF) other than the AMF. The NF may be, for example, a Network Slice Selection Function (NSSF), a Network Data Analytics Function (NWDAF), or a Policy Control Function (PCF). In a case that the NF other than the AMF performs the first condition fulfillment determination, the AMF may provide the NF with at least a part of information necessary for performing the first condition fulfillment determination, specifically, information received from the UE (S606). Then, in a case that the NF determines true or false of the first condition fulfillment determination based on the information received from the AMF, the NF may notify the AMF of information including results (in other words, true or false) of the first condition fulfillment determination. The AMF may determine the identification information and/or the control message to be transmitted to the UE, based on the results of the first condition fulfillment determination received from the NF.

Note that in a case that the first condition fulfillment determination is true, the control message transmitted and/or received in S610 may be the Registration accept message. In a case that the first condition fulfillment determination is false, the control message transmitted and/or received in S610 may be the Registration reject message.

Note that the first condition fulfillment determination may be performed based on reception of the registration request message, and/or each piece of identification information included in the registration request message, and/or subscriber information, and/or capability information of the network, and/or an operator policy, and/or a network state, and/or registration information of a user, and/or a context stored in the AMF, and/or the like.

For example, in a case that the network allows the request of the UE, the first condition fulfillment determination may be determined as true, whereas in a case that the network does not allow the request of the UE, the first condition fulfillment determination may be determined as false. In a case that a network with which the UE is to be registered and/or an apparatus in the network supports the function requested by the UE, the first condition fulfillment determination may be determined as true, whereas in a case that the network and/or the apparatus does not support the function requested by the UE, the first condition fulfillment determination may be determined as false. In addition, in a case that the transmitted and/or received identification information is allowed, the first condition fulfillment determination may be determined as true, whereas in a case that the transmitted and/or received identification information is not allowed, the first condition fulfillment determination may be determined as false.

By transmitting the registration accept message based on each piece of received identification information, and/or subscriber information, and/or capability information of the network, and/or the operator policy, and/or the state of the network, and/or the registration information of the user, and/or the context stored in the AMF, and/or the like, the AMF may indicate that the request from the UE is accepted, or by transmitting the registration reject message, the AMF may indicate that the request from the UE is rejected.

The UE receives the control message (registration accept message or registration reject message) via the base station apparatus (S610). In a case that the control message is the registration accept message, then by receiving the registration accept message, the UE can recognize that the request from the UE on the registration request message is accepted, and recognize contents of various pieces of identification information included in the registration accept message. In a case that the control message is the registration reject message, the UE can recognize that the request from the UE using the registration request message is rejected and the content of various kinds of identification information included in the registration reject message by receiving the registration reject message.

Furthermore, in a case that the control message is the registration accept message, the UE can further transmit to the AMF a registration complete message as a response message to the registration accept message via a first base station apparatus (S612). Here, the registration complete message is a NAS message transmitted and/or received over the N1 interface; however, between the UE and the first base station apparatus, the registration complete message may be included and transmitted and/or received in an RRC message.

The AMF receives the registration complete message via the first base station apparatus (S612). Each apparatus completes the present procedure based on transmission and/or reception of the registration accept message and/or the registration complete message.

Each apparatus may complete the registration procedure based on the transmission and/or reception of the registration reject message.

Note that each apparatus may transition to or maintain a state in which the UE is registered with the network (an RM_REGISTERED state or a 5GMM-REGISTERED state) based on the transmission and/or reception of the registration accept message and/or the registration complete message or may transition to or maintain a state in which the UE is not registered with the network (an RM_DEREGISTERED state or a 5GMM-DEREGISTERED state) over the access in which the UE has received the registration reject message for the current PLMN based on the transmission and/or reception of the registration reject message. Also, the transition of each apparatus to each state may be performed based on reception of the registration complete message or completion of the registration procedure.

In addition, each apparatus may perform processing based on information transmitted and/or received in the registration procedure based on completion of the registration procedure. For example, in a case that information indicating that a part of the request from the UE is rejected is transmitted and/or received, a reason of rejection of the request from the UE may be recognized. In addition, each apparatus may perform the present procedure again or may perform the registration procedure on the core network_A or another cell based on the cause for the rejection of the request from the UE.

Moreover, the UE may store the identification information received along with the registration accept message and/or the registration reject message or may recognize determination of the network, based on the completion of the registration procedure.

Note that the registration procedure described in the present section may be the registration procedure for initial registration, or may be the registration procedure for mobility and periodic registration.

3.4. PDU Session Establishment Procedure

Figure 7:
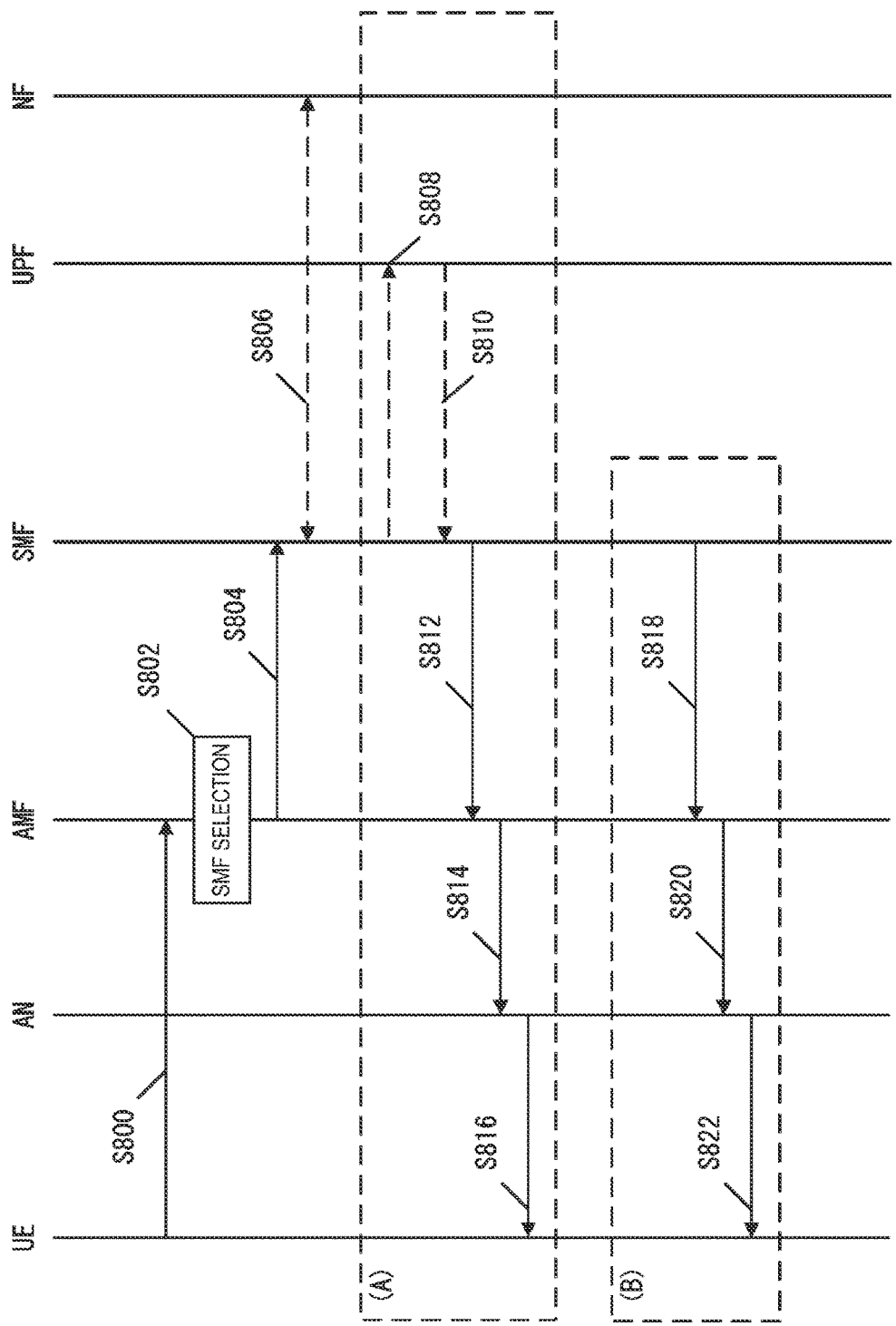
FIG. 7 is a diagram illustrating a PDU session establishment procedure.

A behaviour of each apparatus in the case that the UE performs the PDU session establishment procedure will be described with reference to FIG. 7. In this chapter, the PDU session establishment procedure may be referred to simply as the present procedure, or the PDU session establishment procedure.

Note that the present procedure may be performed after performing the procedure of chapter 3.3 one or more times.

First, the UE transmits the PDU session establishment request message to the SMF to initiate the PDU session establishment procedure. Then, the SMF receives the PDU session establishment request message from the UE.

Specifically, by transmitting the NAS message including an N1 SM container including the PDU session establishment request message to the AMF via the access network (S800), the UE initiates the PDU session establishment procedure. The NAS message may be, for example, a message transmitted via the N1 interface, and may be an uplink NAS transport (UL NAS TRANSPORT) message.

Here, the access network may be 3GPP access or non-3GPP access, and may include the base station apparatus. In other words, the UE transmits the NAS message to the AMF via the base station apparatus.

The UE can notify the network side of what is requested by the UE by including and transmitting the first identification information in the PDU session establishment request message and/or the N1 SM container and/or the NAS message. Here, the first identification information may be as described in chapter 2.7.

The UE, in a case of establishing an Always-on PDU session, may include and transmit the first identification information in the PDU session establishment request message and/or the N1 SM container and/or the NAS message.

Here, the UE, in the case of establishing a PDU session that supports a C2 communication, may include and transmit the first identification information in the PDU session establishment request message and/or the N1 SM container and/or the NAS message. In other words, the UE, in the case of establishing a PDU session that supports a QoS flow for C2 communication, may include and transmit the first identification information in the PDU session establishment request message and/or the N1 SM container and/or the NAS message.

Further, the UE, in the case of requesting to establish a PDU session that supports a C2 communication, may request to establish an Always-on PDU session. In other words, the UE, in the case of requesting to establish a PDU session that supports a QoS flow for C2 communication, may request to establish an Always-on PDU session.

The UE, in the case of establishing a PDU session that provides a C2 communication, may include and transmit the first identification information in the PDU session establishment request message and/or the N1 SM container and/or the NAS message. In other words, the UE, in the case of establishing a PDU session that provides a QoS flow for performing a C2 communication, may include and transmit the first identification information in the PDU session establishment request message and/or the N1 SM container and/or the NAS message.

Further, the UE, in the case of requesting to establish a PDU session that provides a C2 communication, may request to establish an Always-on PDU session. In other words, the UE, in the case of requesting to establish a PDU session that provides a QoS flow for performing a C2 communication, may request to establish an Always-on PDU session.

Furthermore, the UE, in the case of requesting to establish an Always-on PDU session, may include and transmit the first identification information in the PDU session establishment request message and/or the N1 SM container and/or the NAS message.

Note that the UE may determine whether to transmit the first identification information to the network based on the UE capability information, and/or the UE policy, and/or the UE state, and/or the user registration information, and/or a context stored in the UE, and/or the like.

Note that the UE may include and transmit these pieces of identification information in a control message different from these, for example, a control message of a lower layer (for example, an RRC layer, an MAC layer, an RLC layer, a PDCP layer, a SDAP layer, or the like) than the NAS layer, and a control message of a upper layer (for example, a transport layer, a session layer, a presentation layer, an application layer, or the like) than the NAS layer.

Next, in a case that the AMF receives the NAS message, the AMF can recognize what is requested by the UE, and/or details of information and the like (a message, a container, information) included in the NAS message.

Next, the AMF selects the SMF as a transfer destination of at least a part of the information and the like (a message, a container, information) included in the NAS message received from the UE (S802). Note that the AMF may select the SMF being a transfer destination, based on the information and the like (a message, a container, information) included in the NAS message, and/or the subscriber information, and/or the capability information of the network, and/or the UE policy, and/or the operator policy, and/or the state of the network, and/or the registration information of the user, and/or the context stored by the AMF, and/or the like.

Next, the AMF transmits at least a part of the information and the like (a message, a container, information) included in the NAS message received from the UE to the selected SMF via the N11 interface, for example (S804).

Next, in a case that the SMF receives information and the like (a message, a container, information) transmitted from the AMF, the SMF can recognize what is requested by the UE, and/or details of the information and the like (a message, a container, information) received from the AMF.

Here, the SMF may perform a second condition fulfillment determination. The second condition fulfillment determination may be for the network to determine whether or not the request of the UE is accepted. In a case that the SMF determines that the second condition fulfillment determination is true, the SMF may initiate the procedure of (A) of FIG. 7, whereas in a case that the SMF determines that the second condition fulfillment determination is false, the SMF may initiate the procedure of (B) of FIG. 7.

Note that the second condition fulfillment determination may be performed by the NF other than the SMF. The NF may be, for example, an NSSF, an NWDAF, a PCF, or an NRF. In a case that the NF other than the SMF performs the second condition fulfillment determination, the SMF may provide the NF with at least a part of information necessary for performing the second condition fulfillment determination, specifically, information received from the UE (S806).

Then, in a case that the NF determines true or false of the second condition fulfillment determination based on the information received from the SMF, the NF may notify the SMF of information including results (in other words, true or false) of the second condition fulfillment determination. The SMF may determine the identification information, and/or the control message to be transmitted to the UE, based on the results of the second condition fulfillment determination received from the NF.

Note that the second condition fulfillment determination may be performed based on the information and the like (a message, a container, information) received from the AMF, and/or the subscriber information (subscription information), and/or the capability information of the network, and/or the UE policy, and/or the operator policy, and/or the state of the network, and/or the registration information of the user, and/or the context stored by the SMF, and/or the like.

For example, in a case that the network allows the request of the UE, the second condition fulfillment determination may be determined as true, whereas in a case that the network does not allow the request of the UE, the second condition fulfillment determination may be determined as false. In a case that a network as a connection destination of the UE and/or an apparatus in the network supports the function requested by the UE, the second condition fulfillment determination may be determined as true, whereas in a case that the network and/or the apparatus does not support the function requested by the UE, the second condition fulfillment determination may be determined as false. In a case that the transmitted and/or received identification information is allowed, the second condition fulfillment determination may be determined as true, whereas in a case that the transmitted and/or received identification information is not allowed, the second condition fulfillment determination may be determined as false.

In a case that the SMF receives a control message not including the first identification information (the PDU session establishment request message and/or the N1 SM container and/or the NAS message) from the UE, the second condition fulfillment determination may be determined as true or false based on the above description.

Note that the condition for determining true or false of the second condition fulfillment determination need not necessarily be limited to the condition described above.

Next, each step of the procedure of (A) of FIG. 7 will be described.

Next, the SMF may select the UPF for a PDU session to be established, and transmit an N4 session establishment request message to the selected UPF via the N4 interface, for example (S808). The N4 session establishment request message may include at least a part of a PCC rule received from the PCF.

Here, the SMF may select one or more UPFs, based on the information and the like (a message, a container, information) received from the AMF, and/or the information such as the PCC rule received from the PCF, and/or the subscriber information, and/or the capability information of the network, and/or the UE policy, and/or the operator policy, and/or the state of the network, and/or the registration information of the user, and/or the context stored by the SMF, and/or the like. In a case that multiple UPFs are selected, the SMF may transmit the N4 session establishment request message to each UPF. Here, it is assumed that the UPF is selected.

Next, in a case that the UPF receives the N4 session establishment request message (S808), the UPF can recognize details of the information received from the SMF. The UPF may transmit an N4 session establishment response message to the SMF via the N4 interface, for example, based on reception of the N4 session establishment request message (S810).

Next, in a case that the SMF receives the N4 session establishment response message as a response message to the N4 session establishment request message, the SMF can recognize details of the information received from the UPF.

Next, the SMF transmits the PDU session establishment accept message to the UE, based on the reception of the PDU session establishment request message, and/or the selection of the UPF, and/or the reception of the N4 session establishment response message, and/or the like. Then, the UE receives the PDU session establishment accept message from the SMF.

Specifically, the SMF transmits the N1 SM container and/or N2 SM information and/or the PDU session ID to the AMF via the N11 interface, for example, based on the reception of the PDU session establishment request message and/or the selection of the UPF and/or the reception of the N4 session establishment response message, and/or the like (S812). Here, the N1 SM container may include the PDU session establishment accept message. Furthermore, the PDU session ID may be included in the PDU session establishment accept message.

Next, the AMF receiving the N1 SM container and/or the N2 SM information and/or the PDU session ID transmits the NAS message to the UE via the first base station apparatus included in the access network (S814) (S816). Here, the NAS message is transmitted via the N1 interface, for example. The NAS message may be a downlink NAS transport (DL NAS TRANSPORT) message.

Specifically, in a case that the AMF transmits an N2 PDU session request message to the base station apparatus included in the access network (S814), the base station apparatus that has received the N2 PDU session request message transmits the NAS message to the UE (S816). Here, the N2 PDU session request message may include the NAS message and/or the N2 SM information. The NAS message may include the PDU session ID and/or the N1 SM container.

The PDU session establishment accept message may be a response message to the PDU session establishment request. The PDU session establishment accept message may indicate that establishment of the PDU session is accepted.

Here, by transmitting the PDU session establishment accept message, and/or the N1 SM container, and/or the PDU session ID, and/or the NAS message, and/or the N2 SM information, and/or the N2 PDU session request message, the SMF and/or the AMF may indicate that at least a part of the request of the UE by the PDU session establishment request message is accepted.

Here, the SMF and/or the AMF may include and transmit the second identification information in the PDU session establishment accept message and/or the N1 SM container and/or the NAS message and/or the N2 SM information, and/or the N2 PDU session request message. Here, the second identification information may be as described in chapter 2.7.

Note that, by transmitting these pieces of identification information and/or the PDU session establishment accept message, the SMF may indicate that the network supports each function, may indicate that the request of the UE is accepted, may indicate that the request from the UE is not allowed, or may indicate information of a combination of these. Furthermore, in a case that multiple pieces of identification information are transmitted and/or received, two or more pieces of identification information of these pieces of identification information may be configured as one or more pieces of identification information. Note that information indicating support of each function and information indicating a request for use of each function may be transmitted and/or received as the same piece of identification information, or may be transmitted and/or received as different pieces of identification information.

The SMF may include and transmit the second identification information in the PDU session establishment accept message based on the reception of the first identification information from the UE. In other words, in a case that the SMF receives the first identification information from the UE, the SMF may include and transmit the second identification information in the PDU session establishment accept message.

The UE, in the case of the UE establishes a PDU session that supports a C2 communication, the SMF may include and transmit the second identification information in the PDU session establishment accept message. In other words, in the case that the UE establishes a PDU session that supports a QoS flow for C2 communication, the SMF may include and transmit the second identification information in the PDU session establishment accept message.

In the case that the UE establishes a PDU session that provides a C2 communication, the SMF may include and transmit the second identification information in the PDU session establishment accept message. In other words, in the case that the UE establishes a PDU session that provides a QoS flow for performing a C2 communication, the SMF may include and transmit the second identification information in the PDU session establishment accept message.

Here, in a case that the SMF indicates to the UE whether or not establishment of a PDU session as an Always-on PDU session is allowed, the SMF may include the second identification information in the PDU session establishment accept message.

Further, in a case that the SMF allows to establish a PDU session as an Always-on PDU session, the SMF may include the second identification information in the PDU session establishment accept message. In this case, the second identification information may be information indicating that establishment of an Always-on PDU session is required.

Furthermore, in a case that the SMF does not allow to establish a PDU session as an Always-on PDU session, the SMF may include the second identification information in the PDU session establishment accept message. In this case, the second identification information may be information indicating that establishment of an Always-on PDU session is not allowed.

Here, the Always-on PDU session may be a PDU session that supports a C2 communication. In other words, the Always-on PDU session may be a PDU session that supports a QoS flow for C2 communication.

By transmitting at least one of these pieces of identification information, the SMF and/or the AMF can notify the UE of details of these pieces of identification information.

Note that the SMF and/or the AMF may determine which piece of identification information is to be included in the PDU session establishment accept message, and/or the N1 SM container, and/or the NAS message, and/or the N2 SM information, and/or the N2 PDU session request message, based on each piece of received identification information, and/or the subscriber information, and/or the capability information of the network, and/or the UE policy, and/or the operator policy, and/or the state of the network, and/or the registration information of the user, and/or the context stored by the SMF and/or the AMF, and/or the like.

Next, in a case that the UE receives the NAS message via the N1 interface, for example (S816), the UE can recognize that the request of the UE by the PDU session establishment request message is accepted, and/or details of the information and the like (a message, a container, information) included in the NAS message.

The UE may recognize whether or not the PDU session of which establishment is allowed is an Always-on PDU session, based on the second identification information, or the PDU session establishment accept message or the N1 SM container or the NAS message including the second identification information. In other words, in a case that the UE receives the second identification information, or the PDU session establishment accept message or the N1 SM container or the NAS message including the second identification information, the UE may recognize whether or not the PDU session of which establishment is allowed is an Always-on PDU session.

Specifically, in a case that the UE receives the second identification information, or the PDU session establishment accept message or the N1 SM container or the NAS message including the second identification information, and the received second identification information is configured to be the information indicating that establishment of an Always-on PDU session is required, the UE may recognize that the PDU session of which establishment is allowed is an Always-on PDU session. Conversely, in a case that the UE receives the second identification information, or the PDU session establishment accept message or the N1 SM container or the NAS message including the second identification information, and the received second identification information is configured to be the information indicating that establishment of an Always-on PDU session is not allowed, the UE may recognize that the PDU session of which establishment is allowed is not an Always-on PDU session.

Here, the Always-on PDU session may be a PDU session that supports a C2 communication. In other words, the Always-on PDU session may be a PDU session that supports a QoS flow for C2 communication.

Next, each step of the procedure of (B) of FIG. 7 will be described.

First, the SMF transmits the N1 SM container and/or the PDU session ID to the AMF via the N11 interface, for example, based on the reception of the PDU session establishment request message (S818). Here, the N1 SM container may include the PDU session establishment reject message. Furthermore, the PDU session ID may be included in the PDU session establishment reject message.

Next, the AMF receiving the N1 SM container and/or the PDU session ID transmits the NAS message to the UE via the base station apparatus included in the access network (S820) (S822). Here, the NAS message is transmitted via the N1 interface, for example. The NAS message may be a downlink NAS transport (DL NAS TRANSPORT) message. The NAS message may include the PDU session ID and/or the N1 SM container.

The PDU session establishment reject message may be a response message to the PDU session establishment request. The PDU session establishment reject message may indicate that establishment of the PDU session is rejected.

Here, by transmitting the PDU session establishment reject message, and/or the N1 SM container, and/or the PDU session ID, and/or the NAS message, the SMF and/or the AMF may indicate that the request of the UE by the PDU session establishment request message is rejected.

Note that, by transmitting the PDU session establishment reject message, the SMF may indicate that the request of the UE is rejected, may indicate that the request from the UE is not allowed, or may indicate information of a combination of these.

By transmitting at least one of these pieces of identification information, the SMF and/or the AMF can notify the UE of details of these pieces of identification information.

Note that the SMF and/or the AMF may determine which piece of identification information is to be included in the PDU session establishment reject message, and/or the N1 SM container, and/or the NAS message, and/or the N2 SM information, and/or the N2 PDU session request message, based on each piece of received identification information, and/or the subscriber information, and/or the capability information of the network, and/or the UE policy, and/or the operator policy, and/or the state of the network, and/or the registration information of the user, and/or the context stored by the SMF and/or the AMF, and/or the like.

Next, in a case that the UE receives the NAS message via the N1 interface, for example (S822), the UE can recognize that the request of the UE by the PDU session establishment request message is rejected, and/or details of the information and the like (a message, a container, information) included in the NAS message.

Each apparatus may complete the present procedure, based on transmission and/or reception of the PDU session establishment accept message. At this time, each apparatus may transition to a state capable of communicating with the DN using the established PDU session.

Each apparatus may complete the present procedure, based on transmission and/or reception of the PDU session establishment accept message or PDU session establishment reject message. At this time, each apparatus cannot establish a PDU session, so each apparatus cannot communicate with the DN in a case that there is no already established PDU session.

Note that each type of processing performed by the UE based on reception of each piece of identification information described above may be performed during the present procedure or after completion of the present procedure or may be performed based on completion of the present procedure after completion of the present procedure.

3.5. Overview of Network-Initiated Session Management Procedure

Next, an overview of the network-initiated session management procedure will be described. Hereinafter, the network-initiated session management procedure will also be referred to as a present procedure. The present procedure is a procedure for session management performed on an established PDU session on a network-initiative basis.

Note that the present procedure may be a network-initiated PDU session modification procedure, and/or a network-initiated PDU session release (PDU session release) procedure, and/or the like, or a network-initiated session management procedure that is not limited thereto may be performed. Note that each apparatus may transit and/or receive a PDU session modification message in the network-initiated PDU session modification procedure or may transmit and/or receive a PDU session release message in the network-initiated PDU session release procedure.

In a case that the present procedure is a network-initiated PDU session modification procedure, the session management request message in the present procedure may be a PDU session modification command (PDU SESSION MODIFICATION COMMAND) message. In a case that the present procedure is a network-initiated PDU session release procedure, the session management request message in the present procedure may be a PDU session release command (PDU SESSION RELEASE COMMAND) message.

In the case that the present procedure is a network-initiated PDU session modification procedure, the session management complete message in the present procedure may be a PDU session modification complete (PDU SESSION MODIFICATION COMPLETE) message. In the case that the present procedure is a network-initiated PDU session release procedure, the session management complete message in the present procedure may be a PDU session release complete (PDU SESSION RELEASE COMPLETE) message.

In the present procedure, the UE may be a UAV, or may be a UAV controller.

3.5.1. Example of Network-Initiated Session Management Procedure

Figure 8:
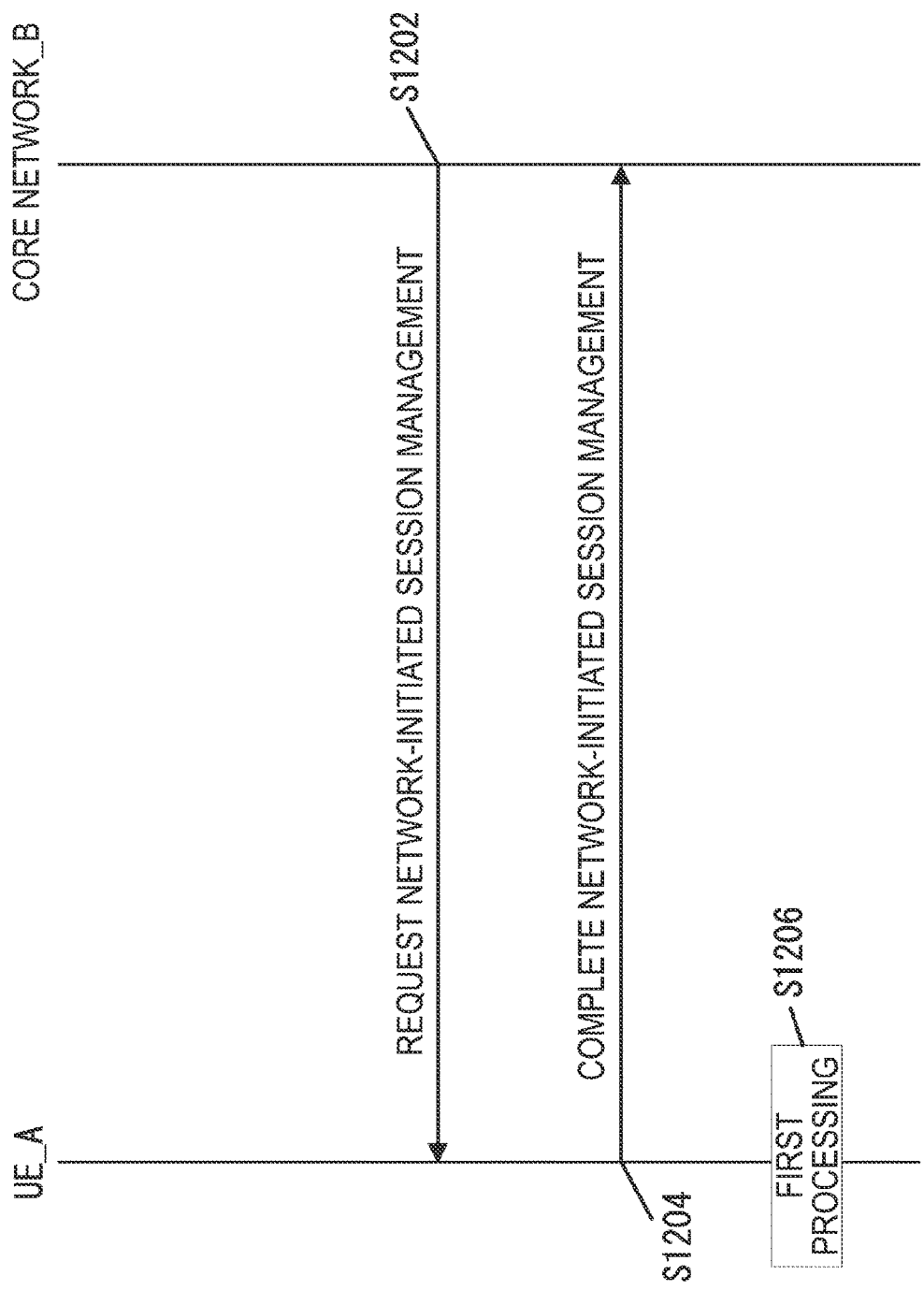
FIG. 8 is a diagram illustrating a network-initiated session management procedure.

An example of the network-initiated session management procedure will be described with reference to FIG. 8. In this section, the present procedure refers to the network-initiated session management procedure. Each step of the present procedure will be described below.

Based on the completion of the registration procedure and/or PDU session establishment procedure, the UE and each apparatus in the core network_B 190 initiate the network-initiated session management procedure at any timing.

Specifically, the apparatus in the core network_B 190 may initiate the present procedure based on the reception of the PDU session modification request message, or may initiate the present procedure based on the reception of the PDU session release request message. Note that in a case that the present procedure is initiated based on the reception of the PDU session modification request message, the present procedure may be a network-initiated PDU session modification procedure. Further, in a case that the present procedure is initiated based on the reception of the PDU session release request message, the present procedure may be a network-initiated PDU session release procedure.

Furthermore, the apparatus in the core network_B 190 may initiate the present procedure based on a request from an apparatus in the DN or another apparatus in the core network.

Specifically, the apparatus in the core network_B 190 may initiate the present procedure based on a request from the UTM. In other words, the apparatus in the core network_B 190 may initiate the present procedure also in a case of receiving a request from the UTM.

Here, the apparatus in the core network_B 190 that initiates the present procedure may be the SMF and/or the AMF, and the UE may transmit and/or receive messages in the present procedure via the AMF and/or over the access network_B. Further, the apparatus in the DN may be an Application Function (AF) in the DN.

The apparatus in the core network_B 190 transmits a network-initiated session management request message to the UE (S1202) to initiate the network-initiated session management. Further, the UE receives the network-initiated session management request message from the apparatus in the core network_B 190.

Here, the apparatus in the core network_B 190 may include at least one of the tenth to fourteenth identification information in the network-initiated session management request message, or may indicate the request from the core network_B 190 by including the identification information. Furthermore, the apparatus in the core network_B 190 may include the PDU session ID in the network-initiated session management request message, or may request to perform modification on the PDU session identified by the PDU session ID by including the PDU session ID.

Here, the apparatus in the core network_B 190 may include the tenth identification information in the network-initiated session management request message in a case that the identification information of the UAV controller is modified. Further, the apparatus in the core network_B 190 may include the tenth identification information in the network-initiated session management request message also in a case that the IP address of the UAV controller is modified.

Furthermore, the apparatus in the core network_B 190 may include the tenth identification information in the network-initiated session management request message in a case that a new UAV controller is assigned. Furthermore, the apparatus in the core network_B 190 may include the tenth identification information in the network-initiated session management request message also in a case that an IP address of a new UAV controller is allocated.

Furthermore, the apparatus in the core network_B 190 may include the eleventh identification information in the network-initiated session management request message in a case that the IP address of the UAV controller is modified. Furthermore, the apparatus in the core network_B 190 may include the eleventh identification information in the network-initiated session management request message even in a case that the identification information of the UAV controller is modified.

Furthermore, the apparatus in the core network_B 190 may include the eleventh identification information in the network-initiated session management request message in a case that an IP address of a new UAV controller is allocated. Furthermore, the apparatus in the core network_B 190 may include the eleventh identification information in the network-initiated session management request message also in a case that a new UAV controller is assigned.

Furthermore, the apparatus in the core network_B 190 may include the twelfth identification information in the network-initiated session management request message in a case that the identification information of the UAV is modified. Further, the apparatus in the core network_B 190 may include the twelfth identification information in the network-initiated session management request message also in a case that the IP address of the UAV is modified.

Furthermore, the apparatus in the core network_B 190 may include the twelfth identification information in the network-initiated session management request message also in a case that a new UAV is assigned. Furthermore, the apparatus in the core network_B 190 may include the twelfth identification information in the network-initiated session management request message also in a case that an IP address of a new UAV is allocated.

Further, the apparatus in the core network_B 190 may include the thirteenth identification information in the network-initiated session management request message in a case that the IP address of the UAV is modified. Furthermore, the apparatus in the core network_B 190 may include the thirteenth identification information in the network-initiated session management request message in a case that the identification information of the UAV is modified.

Furthermore, the apparatus in the core network_B 190 may include the thirteenth identification information in the network-initiated session management request message in a case that an IP address of a new UAV is allocated. Furthermore, the apparatus in the core network_B 190 may include the thirteenth identification information in the network-initiated session management request message also in a case that a new UAV is assigned.

Furthermore, the apparatus in the core network_B 190 may include the fourteenth identification information in the network-initiated session management request message in a case of determining to communicate whether or not the PDU session is an Always-on PDU session to the UE. Furthermore, the apparatus in the core network_B 190 may include the fourteenth identification information in the network-initiated session management request message in a case that the information indicating whether or not the PDU session is an Always-on PDU session is modified.

Furthermore, the apparatus in the core network_B 190 may include the fourteenth identification information in the network-initiated session management request message in a case that the established PDU session is required to be modified to an Always-on PDU session. In this case, the fourteenth identification information may be information indicating that establishment of an Always-on PDU session is required.

Furthermore, the apparatus in the core network_B 190 may include the fourteenth identification information in the network-initiated session management request message in a case that the established PDU session is required to be modified to a PDU session that is not an Always-on PDU session. In this case, the fourteenth identification information may be information indicating that establishment of an Always-on PDU session is not allowed.

Note that the PDU session ID included in the PDU session modification request message may be a PDU session ID of the established PDU session. Furthermore, in a case that the present procedure is performed based on the UE-initiated session management procedure, the PDU session ID included in the PDU session modification request message may be the same as the PDU session ID included in the PDU session modification request message or PDU session release request message.

Next, the UE that has received the network-initiated session management request message transmits a network-initiated session management complete message (S1204).

Moreover, the UE may perform the first processing (S1206) based at least one of pieces of identification information among the tenth to fourteenth identification information received from the core network_B 190 to complete the present procedure. The UE may perform the first processing based on the completion of the present procedure.

Here, the UE may include the PDU session ID in the network-initiated session management complete message. Note that the PDU session ID included in the network-initiated session management complete message may be the same as the PDU session ID included in the network-initiated session management request message.

Hereinafter, an example of the first processing will be described.

Here, the first processing may be processing that the UE recognizes the matters indicated by the core network_B 190, or may be processing that the UE recognizes the request from the core network_B 190. Moreover, the first processing may be processing in which the UE stores the received identification information as a context, or may be processing in which the UE transfers the received identification information to the upper layer and/or the lower layer.

In the first processing, the UE may update the identification information of the UAV controller stored by the UE to the identification information of the UAV controller indicated by the tenth identification information, based on the reception of the tenth identification information. Here, the UE may be the UAV. The UAV controller may be a UAV controller associated with the UAV.

In the words, the UE in the case of receiving the tenth identification information may update the identification information of the UAV controller stored by the UE to the identification information of the UAV controller indicated by the tenth identification information in the first processing.

Further, the UE may delete the identification information of the UAV controller stored by the UE and store the received tenth identification information as the identification information of the UAV controller, based on the reception of the tenth identification information in the first processing. In other words, the UE in the case of receiving the tenth identification information may delete the identification information of the UAV controller stored by the UE and store the received tenth identification information as the identification information of the UAV controller in the first processing.

Further, the UE may recognize the identification information of the new UAV controller, based on the reception of the tenth identification information in the first processing. In other words, the UE in the case of receiving the tenth identification information may recognize the identification information of the new UAV controller in the first processing.

To be specific, the UE may recognize that identification information of an old UAV controller is invalid, and may recognize that the identification information of the new UAV controller is valid, based on the reception of the tenth identification information in the first processing. In other words, the UE in the case of receiving the tenth identification information may recognize that the identification information of the old UAV controller is invalid, and may recognize that the identification information of the new UAV controller is valid in the first processing.

Here, the identification information of the new UAV controller may be information indicated by the received tenth identification information. Further, the identification information of the old UAV controller may be the identification information of the UAV controller stored by the UE.

In the first processing, the UE may update the IP address of the UAV controller stored by the UE to the IP address of the UAV controller indicated by the eleventh identification information, based on reception of the eleventh identification information. Here, the UE may be the UAV. The UAV controller may be a UAV controller associated with the UAV.

In the words, the UE in the case of receiving the eleventh identification information may update the IP address of the UAV controller stored by the UE to the IP address of the UAV controller indicated by the eleventh identification information in the first processing.

Further, the UE may delete the IP address of the UAV controller stored by the UE and store the received eleventh identification information as the IP address of the UAV controller, based on the reception of the eleventh identification information in the first processing. In other words, the UE in the case of receiving the eleventh identification information may delete the IP address of the UAV controller stored by the UE and store the received eleventh identification information as the IP address of the UAV controller in the first processing.

Further, the UE may recognize the IP address of the new UAV controller, based on the reception of the eleventh identification information in the first processing. In other words, the UE in the case of receiving the eleventh identification information may recognize the IP address of the new UAV controller in the first processing.

To be specific, the UE may recognize that an IP address of an old UAV controller is invalid, and may recognize that the IP address of the new UAV controller is valid, based on the reception of the eleventh identification information in the first processing. In other words, the UE in the case of receiving the eleventh identification information may recognize that the IP address of the old UAV controller is invalid, and may recognize that the IP address of the new UAV controller is valid in the first processing.

Here, the IP address of the new UAV controller may be information indicated by the received eleventh identification information. Further, the IP address of the old UAV controller may be the IP address of the UAV controller stored by the UE.

Furthermore, the UE may update the IP address of the UAV controller identified by the tenth identification information to the IP address indicated by the eleventh identification information, based on the reception of the tenth and/or eleventh identification information in the first processing. In the words, the UE in the case of receiving the tenth and/or eleventh identification information may update the IP address of the UAV controller identified by the tenth identification information to the IP address indicated by the eleventh identification information in the first processing.

Further, the UE may delete the IP address of the UAV controller identified by the tenth identification information and store the IP address indicated by the eleventh identification information as the IP address of the UAV controller identified by the tenth identification information, based on the reception of the tenth and/or eleventh identification information in the first processing. In the words, the UE in the case of receiving the tenth and/or eleventh identification information may delete the IP address of the UAV controller identified by the tenth identification information and store the IP address indicated by the eleventh identification information as the IP address of the UAV controller identified by the tenth identification information in the first processing.

In the first processing, the UE may update the identification information of the UAV stored by the UE to the identification information of the UAV indicated by the twelfth identification information, based on reception of the twelfth identification information. Here, the UE may be the UAV controller. The UAV may be a UAV associated with the UAV controller.

In the words, the UE in the case of receiving the twelfth identification information may update the identification information of the UAV stored by the UE to the identification information of the UAV indicated by the twelfth identification information in the first processing.

Further, the UE may delete the identification information of the UAV stored by the UE and store the received twelfth identification information as the identification information of the UAV, based on the reception of the twelfth identification information in the first processing. In other words, the UE in the case of receiving the twelfth identification information may delete the identification information of the UAV stored by the UE and store the received twelfth identification information as the identification information of the UAV in the first processing.

Further, the UE may recognize identification information of a new UAV, based on the reception of the twelfth identification information in the first processing. In other words, the UE in the case of receiving the twelfth identification information may recognize the identification information of the new UAV in the first processing.

To be specific, the UE may recognize that identification information of an old UAV is invalid, and may recognize that the identification information of the new UAV is valid, based on the reception of the twelfth identification information in the first processing. In other words, the UE in the case of receiving the twelfth identification information may recognize that the identification information of the old UAV is invalid, and may recognize that the identification information of the new UAV is valid in the first processing.

Here, the identification information of the new UAV may be information indicated by the received twelfth identification information. Further, the identification information of the old UAV may be the identification information of the UAV stored by the UE.

In the first processing, the UE may update the IP address of the UAV stored by the UE to the IP address of the UAV indicated by the thirteenth identification information, based on reception of the thirteenth identification information. Here, the UE may be the UAV controller. The UAV may be a UAV associated with the UAV controller.

In the words, the UE in the case of receiving the thirteenth identification information may update the IP address of the UAV stored by the UE to the IP address of the UAV indicated by the thirteenth identification information in the first processing.

Further, the UE may delete the IP address of the UAV stored by the UE and store the received thirteenth identification information as the IP address of the UAV, based on the reception of the thirteenth identification information in the first processing. In other words, the UE in the case of receiving the thirteenth identification information may delete the IP address of the UAV stored by the UE and store the received thirteenth identification information as the IP address of the UAV in the first processing.

Further, the UE may recognize the IP address of the new UAV, based on the reception of the thirteenth identification information in the first processing. In other words, the UE in the case of receiving the thirteenth identification information may recognize the IP address of the new UAV in the first processing.

To be specific, the UE may recognize that an IP address of an old UAV is invalid, and may recognize that the IP address of the new UAV is valid, based on the reception of the thirteenth identification information in the first processing. In other words, the UE in the case of receiving the thirteenth identification information may recognize that the IP address of the old UAV is invalid, and may recognize that the IP address of the new UAV is valid in the first processing.

Here, the IP address of the new UAV may be information indicated by the received thirteenth identification information. Further, the IP address of the old UAV may be the IP address of the UAV stored by the UE.

Furthermore, the UE may update the IP address of the UAV identified by the twelfth identification information to the IP address indicated by the thirteenth identification information, based on the reception of the twelfth and/or thirteenth identification information in the first processing. In the words, the UE in the case of receiving the twelfth and/or thirteenth identification information may update the IP address of the UAV identified by the twelfth identification information to the IP address indicated by the thirteenth identification information in the first processing.

Further, the UE may delete the IP address of the UAV identified by the twelfth identification information and store the IP address indicated by the thirteenth identification information as the IP address of the UAV identified by the twelfth identification information, based on the reception of the twelfth and/or thirteenth identification information in the first processing. In the words, the UE in the case of receiving the twelfth and/or thirteenth identification information may delete the IP address of the UAV identified by the twelfth identification information and store the IP address indicated by the thirteenth identification information as the IP address of the UAV identified by the twelfth identification information in the first processing.

In the first process, the UE may recognize whether or not the established PDU session is an Always-on PDU session, based on reception of the fourteenth identification information. In other words, the UE in the case of receiving the fourteenth identification information may recognize whether or not the established PDU session is an Always-on PDU session in the first processing.

Specifically, in a case that the UE receives the fourteenth identification information, and the received fourteenth identification information is configured to be the information indicating that establishment of an Always-on PDU session is required, the UE may recognize that the established and/or modified PDU session is an Always-on PDU session in the first processing. Conversely, in a case that the UE receives the fourteenth identification information, and the received fourteenth identification information is configured to be the information indicating that establishment of an Always-on PDU session is not allowed, the UE may recognize that the established and/or modified PDU session is not an Always-on PDU session in the first processing.

Furthermore, in a case that the UE does not receive the fourteenth identification information, the UE may recognize whether or not the established and/or modified PDU session is an Always-on PDU session, based on the second and/or fourteenth identification information received during the previously performed procedure.

Specifically, in a case that the UE does not receive the fourteenth identification information, and further, the second and/or fourteenth identification information received during the previously performed procedure are configured to be the information indicating that establishment of an Always-on PDU session is required, the UE may recognize that the established and/or modified PDU session is an Always-on PDU session in the first processing. Conversely, in a case that the UE does not receive the fourteenth identification information, and further, the second and/or fourteenth identification information received during the previously performed procedure are configured to be the information indicating that establishment of an Always-on PDU session is not allowed, the UE may recognize that the established and/or modified PDU session is not an Always-on PDU session in the first processing.

Here, the Always-on PDU session may be a PDU session that supports a C2 communication. In other words, the Always-on PDU session may be a PDU session that supports a QoS flow for C2 communication.

Furthermore, each apparatus may perform processing based on identification information transmitted and/or received in the present procedure, based on completion of the present procedure. In other words, the UE may perform the first processing based on the completion of the present procedure or may complete the present procedure after the completion of the first processing.

Furthermore, each apparatus completes a first network-initiated session management procedure, based on the completion of the processing described above, and/or the transmission and/or reception of the network-initiated session management request message and/or network-initiated session management complete message.

3.6. Overview of UE-Initiated Session Management Procedure

Next, an overview of the UE-initiated session management procedure will be described. Hereinafter, the UE-initiated session management procedure will also be referred to as a present procedure. The present procedure is a procedure for session management performed on a UE initiative based on the established PDU session.

Note that the present procedure may be a UE-initiated PDU session modification procedure, and/or a UE-initiated PDU session release procedure, and/or the like, or a UE-initiated session management procedure that is not limited thereto may be performed. Note that each apparatus may transmit and/or receive the PDU session modification request message and/or the PDU session modification command message and/or the PDU session modification complete message and/or the PDU session modification reject message in the UE-initiated PDU session modification procedure. Each apparatus may transmit and/or receive the PDU session release request message and/or the PDU session release command message and/or the PDU session release complete message and/or the PDU session release reject message in the UE-initiated PDU session release procedure.

Furthermore, each apparatus completes the UE-initiated session management procedure, based on the completion of the processing described above, and/or the transmission and/or reception of the UE-initiated session management request message and/or UE-initiated session management complete message.

3.6.1. Example of UE-Initiated PDU Session Modification Procedure

Figure 9:
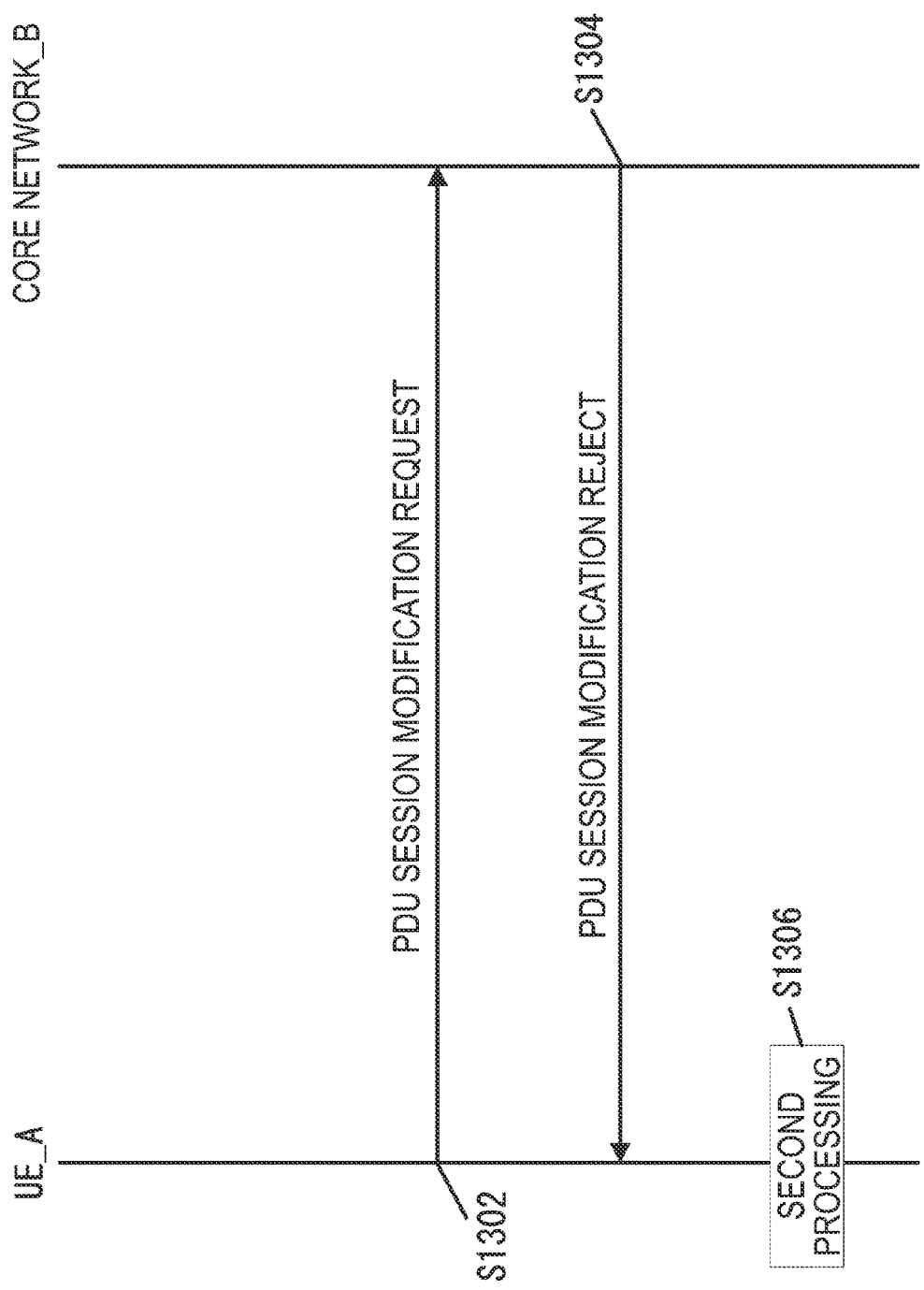
FIG. 9 is a diagram illustrating a UE-initiated session management procedure.

In this section, the present procedure refers to the UE-initiated PDU session modification procedure. Each step of the present procedure will be described below with reference to FIG. 9.

Note that the UE can initiate the UE-initiated PDU session modification procedure at any timing, based on the completion of the registration procedure and/or PDU session establishment procedure. In other words, the UE may initiate the UE-initiated PDU session modification procedure for the established PDU session at any timing. Further, in other words, the UE may initiate the UE-initiated PDU session modification procedure using the same PDU session ID as the established PDU session at any timing.

First, the UE transmits the PDU session modification request message to the SMF (S1302) to initiate the UE-initiated PDU session modification procedure. Here, the UE may include the PDU session ID in the PDU session modification request message, or may request to perform modification on the PDU session identified by the PDU session ID by including the PDU session ID.

Note that the PDU session ID included in the PDU session modification request message may be a PDU session ID of the established PDU session.

The UE may not have to transmit the PDU session modification request message in a case of being in flight. In other words, the UE may be configured to be prohibited from transmitting the PDU session modification request message in the case of being in flight.

Here, the UE may detect that the UE is in flight in a lower layer (for example, an RRC layer, an MAC layer, an RLC layer, a PDCP layer, a SDAP layer, or the like) than the NAS layer, and a upper layer (for example, a transport layer, a session layer, a presentation layer, an application layer, or the like) than the NAS layer.

The UE may detect that the UE is in flight based on receiving the control message requesting flight before the present procedure is performed. In other words, the UE may detect that the UE is in flight in a case of receiving the control message requesting flight before the present procedure is performed.

The UE may detect that the UE is in flight in a lower layer (for example, an RRC layer, an MAC layer, an RLC layer, a PDCP layer, a SDAP layer, or the like) than the NAS layer, and a upper layer (for example, a transport layer, a session layer, a presentation layer, an application layer, or the like) than the NAS layer, based on receiving the control message requesting flight before the present procedure is performed. In other words, the UE may detect that the UE is in flight in the case of receiving the control message requesting flight before the present procedure is performed, in a lower layer (for example, an RRC layer, an MAC layer, an RLC layer, a PDCP layer, a SDAP layer, or the like) than the NAS layer, and a upper layer (for example, a transport layer, a session layer, a presentation layer, an application layer, or the like) than the NAS layer.

Next, the SMF receives the PDU session modification request message transmitted from the UE. In a case that the SMF accepts the request from the UE, the SMF initiates the network-initiated PDU session modification procedure. Conversely, in a case that the SMF rejects the request from the UE, the SMF transmits a PDU session modification reject message to the UE. Hereinafter, a case that the SMF rejects the request from the UE will be described.

The SMF transmits the PDU session modification reject message to the UE, based on the acceptance of the PDU session establishment request message (S1304). Here, the SMF may include the fifteenth identification information or the PDU session ID in the PDU session modification reject message, or may indicate that the request from the UE is rejected by including the identification information.

Here, in a case that the UE is in flight, the SMF may include the twentieth identification information in the PDU session modification reject message. In other words, in a case that the SMF recognizes that the UE is in flight, the SMF may include the twentieth identification information in the PDU session modification reject message.

Further, in a case that the SMF receives the information indicating that the UE is in flight from the UTM, the SMF may include the twentieth identification information in the PDU session modification reject message.

Furthermore, in a case that the SMF receives the information indicating that the UE is in flight from the UAV controller, the SMF may include the twentieth identification information in the PDU session modification reject message.

Further, in a case that the SMF receives the information indicating that the UE is in flight from the core network apparatus, the SMF may include the twentieth identification information in the PDU session modification reject message.

Furthermore, in a case that the SMF rejects modification of the PDU session in other cases than the above, the SMF may include the twentieth identification information in the PDU session modification reject message.

Here, the PDU session ID included in the PDU session modification reject message may be the same as the PDU session ID included in the PDU session modification request message. In other words, the PDU session ID included in the PDU session modification reject message may be the same as the PDU session ID provided from the UE during the present procedure.

The UE receives the PDU session modification reject message. Furthermore, each apparatus completes the present procedure based on the transmission and/or reception of the PDU session modification reject message and/or the completion of the network-initiated PDU session modification procedure.

Here, the UE may recognize that the request from the UE is rejected, based on the reception of the PDU session modification reject message. Further, the UE may perform the second processing, based on the reception of the PDU session modification reject message. Note that the second processing may be performed based on the completion of the present procedure.

Here, the second processing may be processing in which the UE recognizes the matters indicated by the SMF. Moreover, the second processing may be processing in which the UE stores the received identification information as a context, or may be processing in which the UE transfers the received identification information to the upper layer and/or the lower layer. Moreover, the second processing may be processing in which the UE recognizes that the request of the present procedure is rejected.

Here, in the second process, the UE may recognize the cause for the rejection, based on the reception of the twentieth identification information and/or PDU session modification reject message including the twentieth identification information. Specifically, the UE may recognize that the modification of the PDU session is rejected because the UE is flight, based on the reception of the twentieth identification information and/or PDU session modification reject message including the twentieth identification information.

In other words, in the second process, the UE in the case of receiving the twentieth identification information and/or PDU session modification reject message including the twentieth identification information may recognize the cause for the rejection. Specifically, in the case that the UE receives the twentieth identification information and/or PDU session modification reject message including the twentieth identification information, the UE may recognize that the modification of the PDU session is rejected because the UE is flight.

Furthermore, in the case that the UE receives the twentieth identification information and/or PDU session modification reject message including the twentieth identification information, the UE may be configured to be prohibited from initiating the PDU session modification procedure and/or PDU session release procedure with respect to the same PDU session. In other words, further, in the case that the UE receives the twentieth identification information and/or PDU session modification reject message including the twentieth identification information, the UE may be configured to be prohibited from transmitting the PDU session modification request message and/or PDU session release request message to the same PDU session.

To be more specific, in the case that the UE receives the twentieth identification information and/or PDU session modification reject message including the twentieth identification information, the UE may be configured to be prohibited from initiating the PDU session modification procedure and/or PDU session release procedure with respect to the same PDU session for a certain period of time. In other words, further, in the case that the UE receives the twentieth identification information and/or PDU session modification reject message including the twentieth identification information, the UE may be configured to be prohibited from transmitting the PDU session modification request message and/or PDU session release request message to the same PDU session for a certain period of time.

Here, the certain period of time may be a time period determined by a timer and/or a state that the UE holds. Specifically, the certain period of time may be a time period while the timer is being executed. Further, the certain period of time may be while the UE is in flight. In other words, the certain period of time may be while the state indicates being in flight. Note that the certain period of time may be any time period not limited to these periods.

In addition, the PDU session modification procedure and/or PDU session release procedure with respect to the same PDU session may be a PDU session modification procedure and/or PDU session release procedure using the same PDU session ID.

Furthermore, each apparatus completes the UE-initiated PDU session modification procedure, based on the completion of the processing described above, and/or the transmission and/or reception of the UE-initiated PDU session modification reject message.

3.6.2. Example of UE-Initiated PDU Session Release Procedure

In this section, the present procedure refers to the UE-initiated PDU session release procedure. Each step of the present procedure will be described below.

The UE-initiated PDU session release procedure may be a procedure similar to the PDU session modification procedure described above.

Specifically, in a case that the present procedure is the UE-initiated PDU session release procedure, the PDU session modification request message described above may be interpreted as the PDU session release request message. Further, in the case that the present procedure is the UE-initiated PDU session release procedure, the PDU session modification request message described above may be interpreted as the PDU session release request message, or the PDU session modification reject message described above may be interpreted as the PDU session release reject message. The behaviour of modifying the PDU session may be interpreted as the behaviour of releasing the PDU session.

Furthermore, in the case that the present procedure is the UE-initiated PDU session release procedure, the behaviour of the SMF performed based on the reception of the PDU session release request message may be similar to the behaviour of the SMF performed based on the reception of the PDU session modification request message described above. Furthermore, in the case that the present procedure is the UE-initiated PDU session release procedure, the behaviour of the UE performed based on the reception of the PDU session release reject message may be similar to the behaviour of the UE performed based on the receiving the PDU session modification reject message described above.

Furthermore, in the case that the present procedure is the UE-initiated PDU session release procedure, the SMF may initiate the network-initiated PDU session release procedure based on the reception of the PDU session release request message, or may transmit the PDU session release reject message to the UE.

Further, each apparatus completes the UE-initiated PDU session release procedure, based on the completion of the processing described above, and/or the transmission and/or reception of the UE-initiated PDU session release reject message.

4. Modified Examples

A program running on an apparatus according to an aspect of the present invention may serve as a program that controls a Central Processing Unit (CPU) and the like to cause a computer to function in such a manner as to realize the functions of the embodiment according to the aspect of the present invention. Programs or information handled by the programs are temporarily stored in a volatile memory such as a Random Access Memory (RAM), a non-volatile memory such as a flash memory, a Hard Disk Drive (HDD), or another storage device system.

Note that a program for realizing the functions of the embodiment according to an aspect of the present invention may be recorded in a computer-readable recording medium. The functions may be realized by causing a computer system to read the program recorded on the recording medium for execution. It is assumed that the "computer system" refers to a computer system built into the apparatuses, and the computer system includes an operating system and hardware components such as a peripheral device. Furthermore, the "computer-readable recording medium" may be any of a semiconductor recording medium, an optical recording medium, a magnetic recording medium, a medium dynamically retaining the program for a short time, or any other computer readable recording medium.

Furthermore, each functional block or various features of the apparatuses used in the aforementioned embodiment may be implemented or performed on an electric circuit, for example, an integrated circuit or multiple integrated circuits. An electric circuit designed to perform the functions described in the present specification may include a general purpose processor, a digital signal processor (DSP), an application specific integrated circuit (ASIC), a field programmable gate array (FPGA), or other programmable logic devices, discrete gates or transistor logic, discrete hardware components, or a combination thereof. The general-purpose processor may be a microprocessor, or may be a processor of a known type, a controller, a micro-controller, or a state machine instead. The aforementioned electric circuit may include a digital circuit or may include an analog circuit. In a case that with advances in semiconductor technology, a circuit integration technology appears that replaces the present integrated circuits, it is possible for one or multiple aspects of the present invention to use a new integrated circuit based on the technology.

Note that the invention of the present application is not limited to the above-described embodiments. In the embodiment, apparatuses have been described as an example, but an aspect of the invention of the present application is not limited to these apparatuses, and is applicable to a terminal apparatus or a communication apparatus of a fixed-type or a stationary-type electronic apparatus installed indoors or outdoors, for example, an AV apparatus, a kitchen apparatus, a cleaning or washing machine, an air-conditioning apparatus, office equipment, a vending machine, and other household apparatuses.

Although, the embodiments of the present invention have been described in detail above referring to the drawings, the specific configuration is not limited to the embodiments and includes, for example, design changes within the scope that does not depart from the gist of the present invention. For an aspect of the present invention, various modifications are possible within the scope of the claims, and embodiments that are made by suitably combining technical means disclosed according to the different embodiments are also included in the technical scope of the present invention. Furthermore, a configuration in which elements described in the respective embodiments and having mutually the same effects, are substituted for one another is also included.

The invention claimed is:

1. A UAV comprising:
   transmission and reception circuitry; and
   a controller,
   in a case that the transmission and reception circuitry receives, from a network, a PDU session modification command message including first identification information, the controller forwards the first identification information to an upper layer, and
   the first identification information is identification information of the UAV.

2. The UAV of claim 1, wherein
   the transmission and reception circuitry receives the PDU session modification command message including second identification information and/or third identification information;
   the second identification information is identification information of a new UAV controller, and
   the third identification information is an IP address of a new UAV controller.

3. A communication control method performed by a UAV, the communication control method comprising:
   receiving, from a network, a PDU session modification command; and
   in a case that the PDU session modification command message includes first identification information, forwarding the first identification information to an upper layer, wherein
   the first identification information is identification information of the UAV.

* * * * *